(12) United States Patent
Okamoto

(10) Patent No.: US 9,891,437 B2
(45) Date of Patent: Feb. 13, 2018

(54) IMAGE DISPLAY APPARATUS

(71) Applicant: Seiko Epson Corporation, Tokyo (JP)

(72) Inventor: Junichi Okamoto, Fujimi (JP)

(73) Assignee: Seiko Epson Corporation (JP)

( * ) Notice: Subject to any disclaimer, the term of this patent is extended or adjusted under 35 U.S.C. 154(b) by 79 days.

(21) Appl. No.: 15/158,937

(22) Filed: May 19, 2016

(65) Prior Publication Data

US 2016/0349513 A1      Dec. 1, 2016

(30) Foreign Application Priority Data

May 26, 2015   (JP) ................................ 2015-106190

(51) Int. Cl.
  *G02B 26/08*   (2006.01)
  *G02B 27/01*   (2006.01)

(52) U.S. Cl.
  CPC .. *G02B 27/0172* (2013.01); *G02B 2027/0112* (2013.01)

(58) Field of Classification Search
  CPC .. G02B 26/101; G02B 26/105; G02B 26/123; G02B 2027/0112; G02B 27/01; G02B 27/0172; G09G 3/025; G09G 3/02
  USPC ............. 359/204.1–204.2, 199.1–199.4, 359/200.6–200.8, 201.1–202.1, 359/213.1–214.1, 224.1–226.2; 347/232–233, 243–244, 258–260
  See application file for complete search history.

(56) References Cited

U.S. PATENT DOCUMENTS

| | | | |
|---|---|---|---|
| 2014/0126033 A1* | 5/2014 | Hirata | G02B 17/08 359/202.1 |
| 2017/0052423 A1 | 2/2017 | Okamoto | |
| 2017/0200422 A1 | 7/2017 | Okamoto et al. | |

FOREIGN PATENT DOCUMENTS

| | | |
|---|---|---|
| JP | 2006-301050 A | 11/2006 |
| JP | 2007-093644 A | 4/2007 |
| JP | 2009-025372 A | 2/2009 |
| JP | 2011-126133 A | 6/2011 |
| JP | 2017-040886 A | 2/2017 |
| JP | 2017-125905 A | 7/2017 |

* cited by examiner

*Primary Examiner* — James Phan
(74) *Attorney, Agent, or Firm* — Harness, Dickey & Pierce, P.L.C.

(57) ABSTRACT

An image display apparatus includes a light output part that outputs modulated lights and a light scanning part that performs scanning with the modulated lights in first directions and second directions. Scanning with the respective modulated lights is performed only in ones of outward paths and return paths in the first directions, in an image plane, irradiated points of the modulated lights are arranged side by side in directions crossing the first directions, the scanning of the modulated lights is performed in the second directions for two scanning lines extending in the first directions at a time, and one of the irradiated points at a certain time is located in a position different from those of scanning tracks of the other.

9 Claims, 26 Drawing Sheets

IMAGE DISPLAY APPARATUS

BACKGROUND

1. Technical Field

The present invention relates to an image display apparatus.

2. Related Art

For example, Patent Document 1 (JP-A-2006-301050) discloses a laser scanning image display apparatus that displays images by laser scanning using a light scanner. In the image display apparatus, a configuration for reciprocating scanning of three green lasers output from three green light sources in three lines in a main scanning direction is disclosed (for example, see FIG. 7 of Patent Document 1).

According to the configuration as in Patent Document 1, higher resolution can be realized, however, the following problem arises. That is, the scanning tracks of the lasers in the main scanning direction are sine waves, and, in both lateral ends of an image, parts with higher pixel density and parts with lower pixel density are alternately generated in the longitudinal direction (sub-scanning direction). Accordingly, uneven brightness is produced and homogeneous images cannot be displayed.

SUMMARY

An advantage of some aspects of the invention is to provide an image display apparatus with less uneven brightness by reducing higher and lower pixel density.

The advantage can be achieved by the invention described below.

An image display apparatus according to an aspect of the invention includes a light output part that outputs n (n is an integer equal to or more than two) luminous fluxes, and a light scanning part having a swingable movable portion and performing scanning with the respective luminous fluxes reflected by the movable portion in first directions and second directions crossing the first directions, wherein the light scanning part performs scanning with the respective luminous fluxes at a first frequency in the first directions and a second frequency higher than the first frequency in the second directions and only in ones of outward paths and return paths with respect to the first directions, in an image plane as a plane on which the luminous fluxes of the scanning by the light scanning part form an image, irradiated points of the respective luminous fluxes are arranged side by side in directions crossing the first directions, the scanning of the respective luminous fluxes is performed in the second directions for n scanning lines extending in the first directions at a time, and the irradiated points of the respective luminous fluxes when the movable portion takes a certain attitude are located in positions different from those of scanning tracks of the other luminous fluxes.

With this configuration, the image display apparatus with less uneven brightness may be obtained by reducing higher and lower pixel density.

In the image display apparatus according to the aspect of the invention, it is preferable that, assuming that scanning with the respective n luminous fluxes is performed on the respective $m_1$th to $m_n$th ($m_1$ to $m_n$ are natural numbers) scanning lines from one side of the image plane in the second directions, remainders of division of the respective $m_1$ to $m_n$ by n are different from one another.

With this configuration, the scanning tracks of the respective luminous fluxes do not overlap on the image plane. If two scanning tracks overlap on the image plane, the brightness of the overlapping parts changes and image quality becomes lower. Further, in order to prevent the brightness change, special control of reducing the brightness of the luminous fluxes in the position in which the scanning tracks overlap or the like is required, and the control become complex.

In the image display apparatus according to the aspect of the invention, it is preferable that the n is three or more, and, when the movable portion takes a certain attitude, in at least two of the n luminous fluxes, the scanning lines corresponding to the irradiated points of each other lie next to each other.

With this configuration, the light output part may be downsized.

In the image display apparatus according to the aspect of the invention, it is preferable that the n is three or more, and, when the movable portion takes a certain attitude, in at least two of the n luminous fluxes, the scanning lines corresponding to the other luminous fluxes are located between the scanning lines corresponding to the irradiated points of each other.

With this configuration, the degree of freedom of design of the light output part increases.

In the image display apparatus according to the aspect of the invention, it is preferable that the n is three or more, and, when the movable portion takes a certain attitude, the scanning lines corresponding to the irradiated points of the respective luminous fluxes are apart from each other at equal intervals.

With this configuration, the configuration of the light output part become simpler.

In the image display apparatus according to the aspect of the invention, it is preferable that the n is seven or less.

With this configuration, the number of luminous fluxes may be made appropriate.

In the image display apparatus according to the aspect of the invention, it is preferable that the luminous flux is a modulated light having modulated intensity.

With this configuration, a desired image may be easily displayed.

In the image display apparatus according to the aspect of the invention, it is preferable that the light output part outputs n luminous fluxes of a first color light and n luminous fluxes of a second color light, irradiated points of the n luminous fluxes of the first color light and irradiated points of the n luminous fluxes of the second color light when the movable portion takes a certain attitude are located in different positions on the image plane, and the irradiated points of the n luminous fluxes of the first color light and the irradiated points of the n luminous fluxes of the second color light are combined on the image plane by scanning in the second directions.

With this configuration, a color image may be provided without color combination in the light output part.

It is preferable that the image display apparatus according to the aspect of the invention is a head mounted display worn on the head of an observer.

With this configuration, the convenience of the image display apparatus is improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, embodiments of an image display apparatus according to the invention will be explained with reference to the drawings.

First Embodiment

Figure 1:
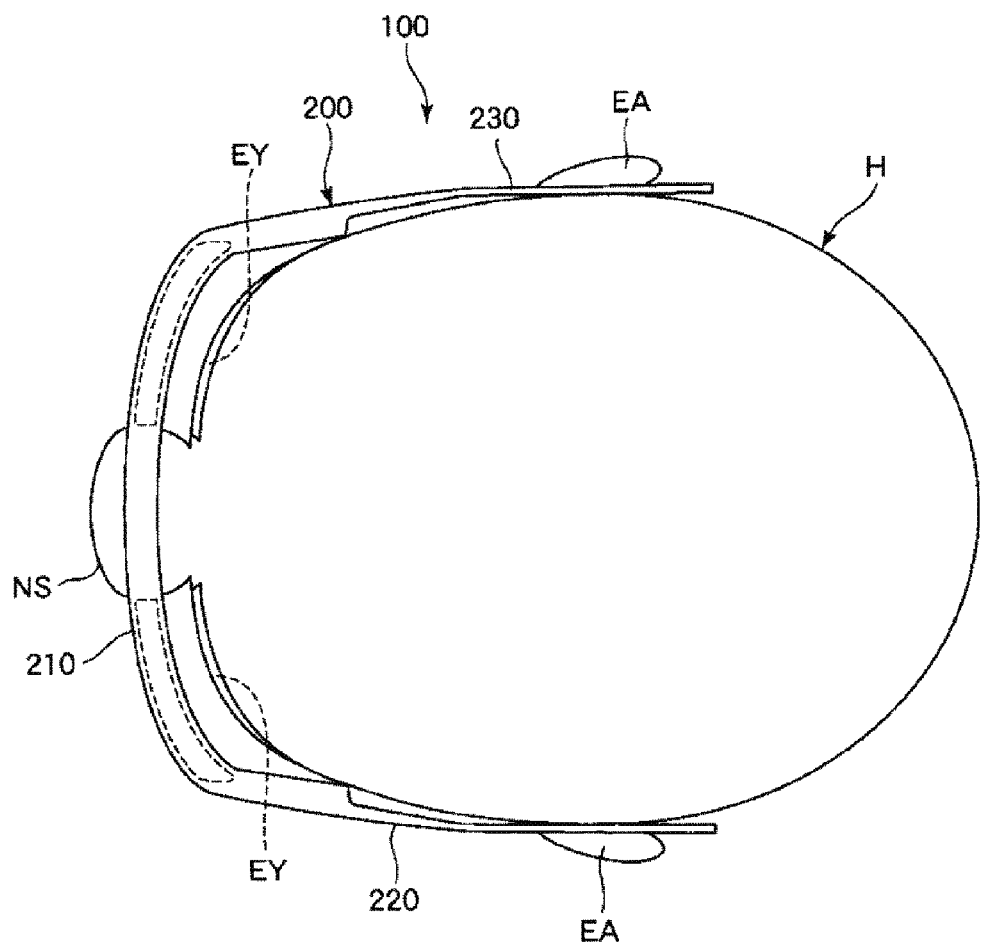
FIG. 1 shows a schematic configuration of an image display apparatus according to a first embodiment of the invention.
Figure 2:
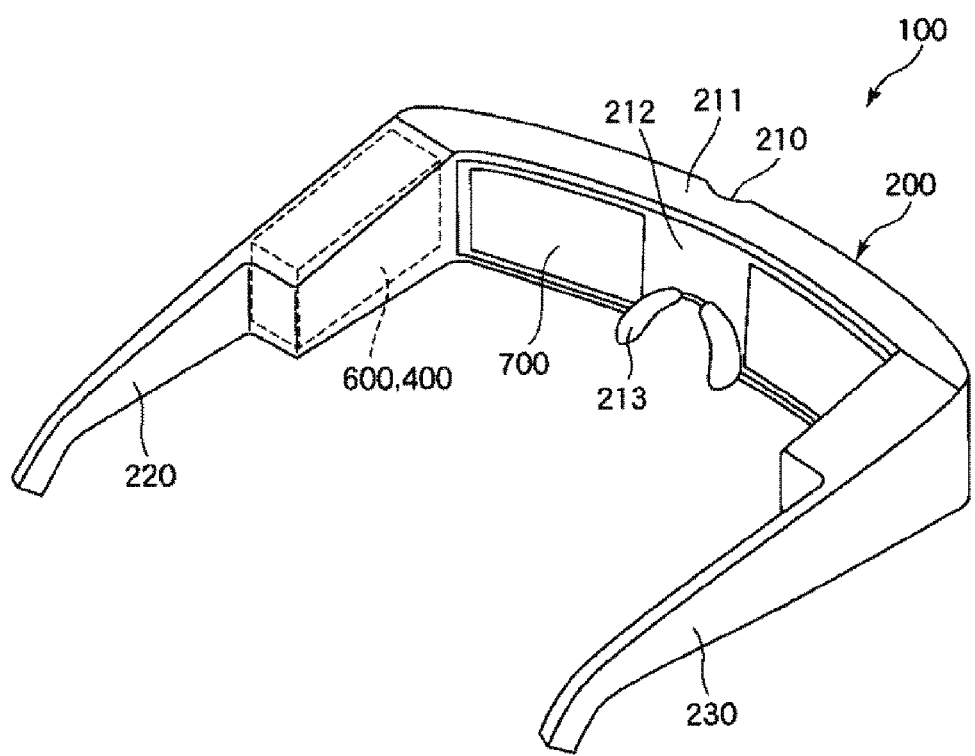
FIG. 2 is a perspective view of the image display apparatus shown in FIG. 1.
Figure 3:
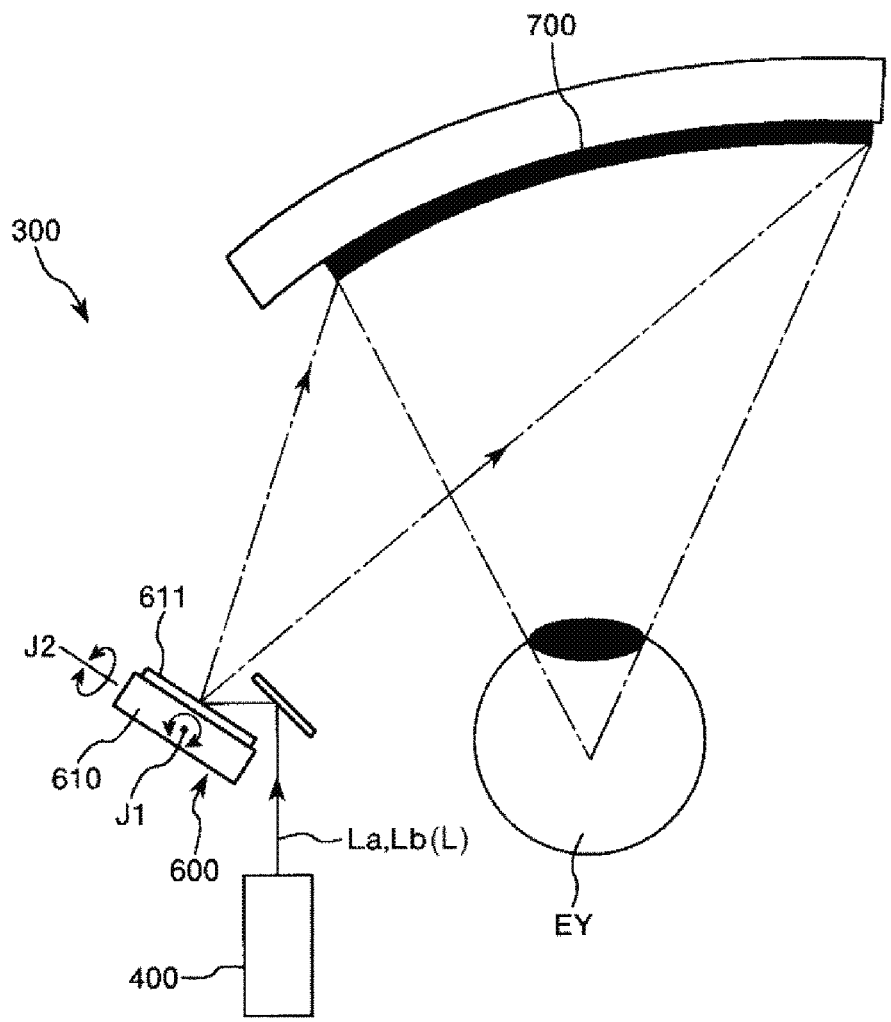
FIG. 3 is a schematic configuration diagram of a display unit of the image display apparatus shown in FIG. 1.
Figure 4:
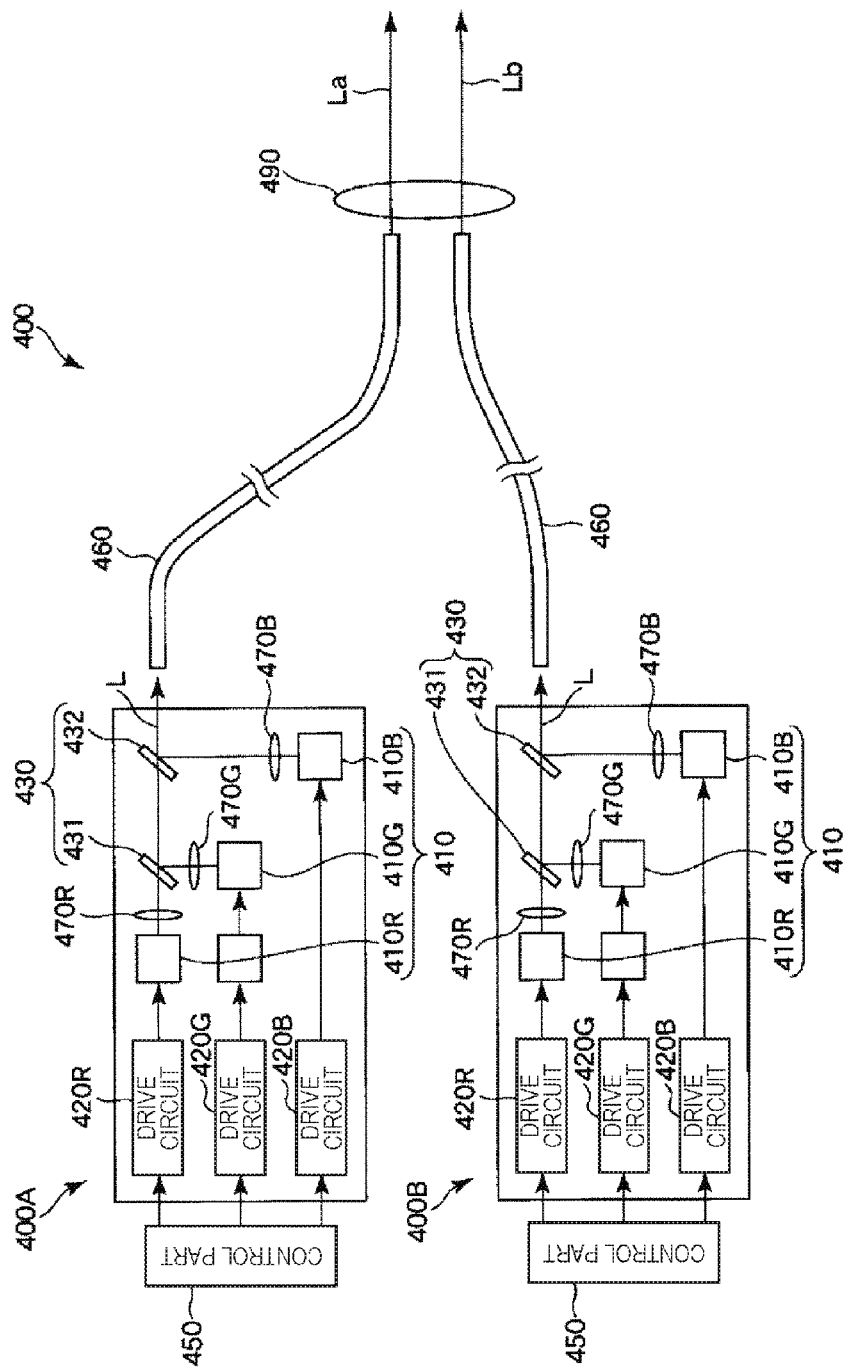
FIG. 4 shows a configuration of a light output part included in the display unit.
Figure 5:
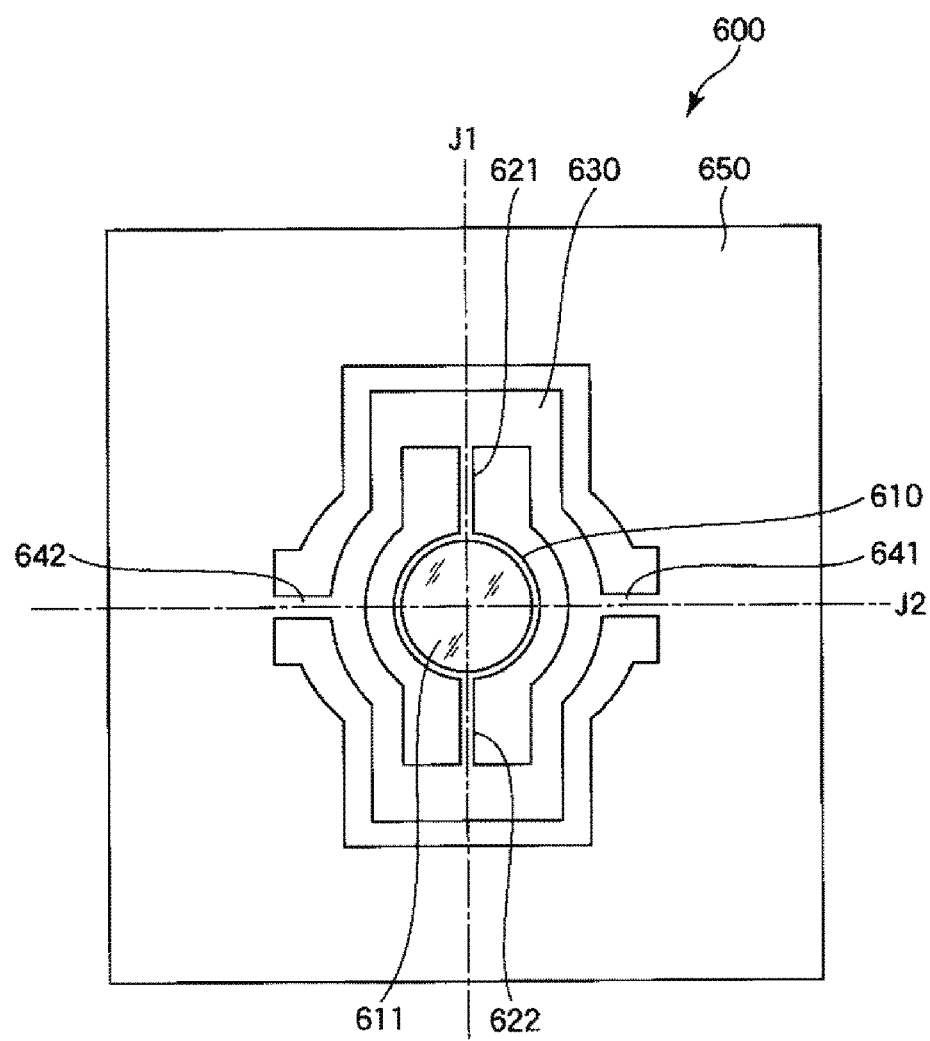
FIG. 5 is a plan view showing a light scanning part included in the display unit.
Figure 6:
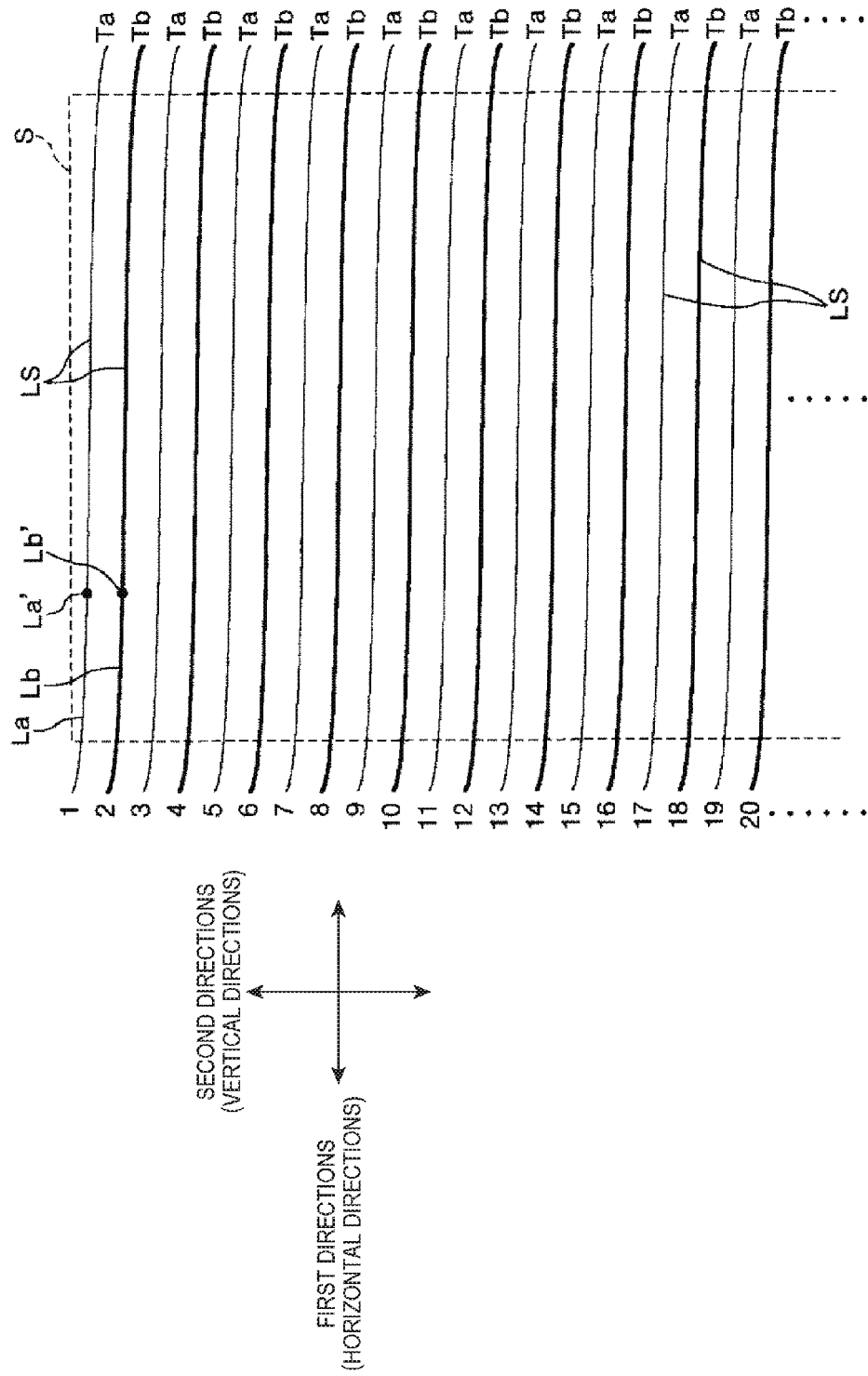
FIG. 6 shows scanning tracks of modulated lights on an image plane.
Figure 7:
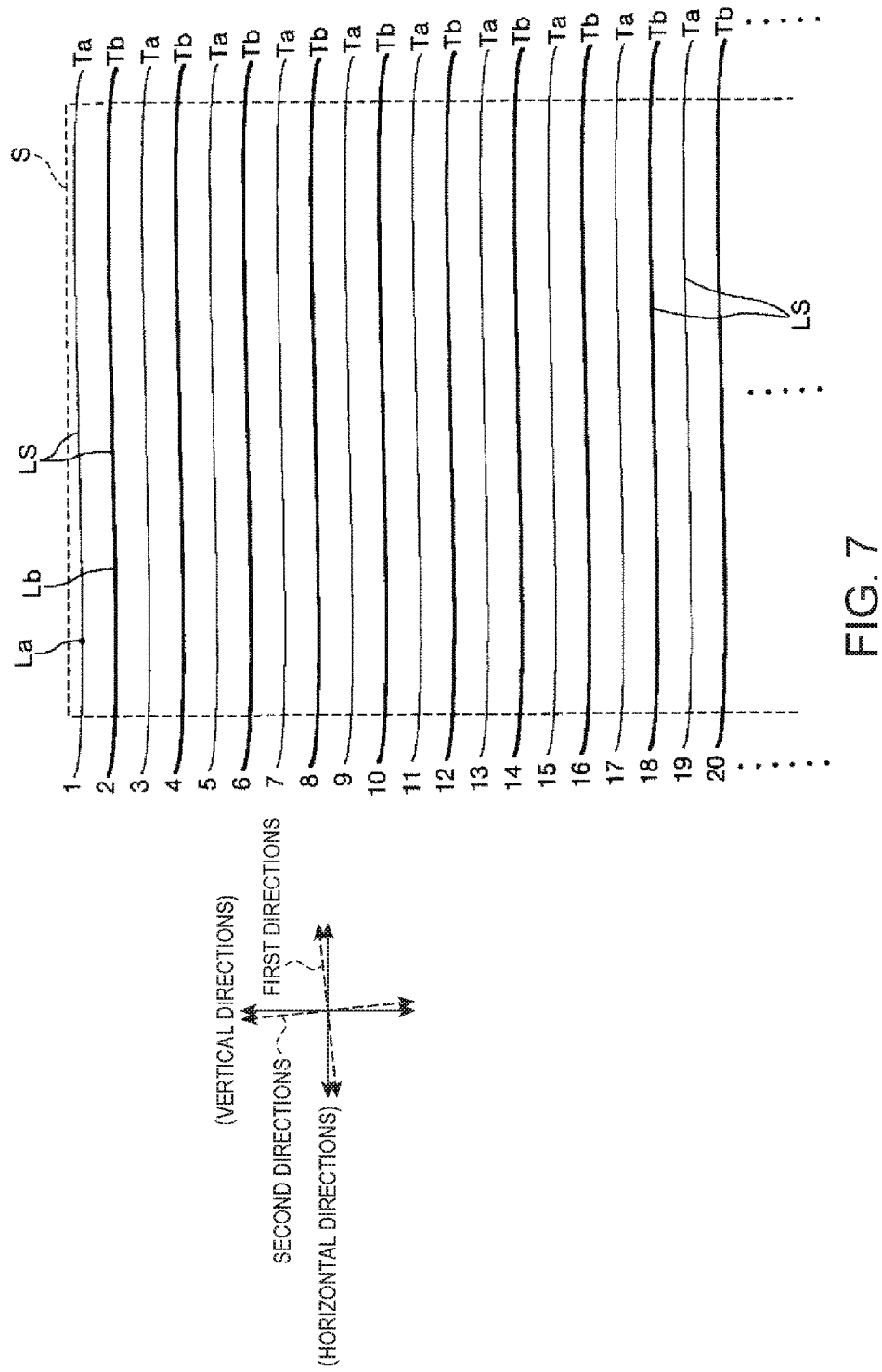
FIG. 7 shows scanning tracks of modulated lights on the image plane.
Figure 8:
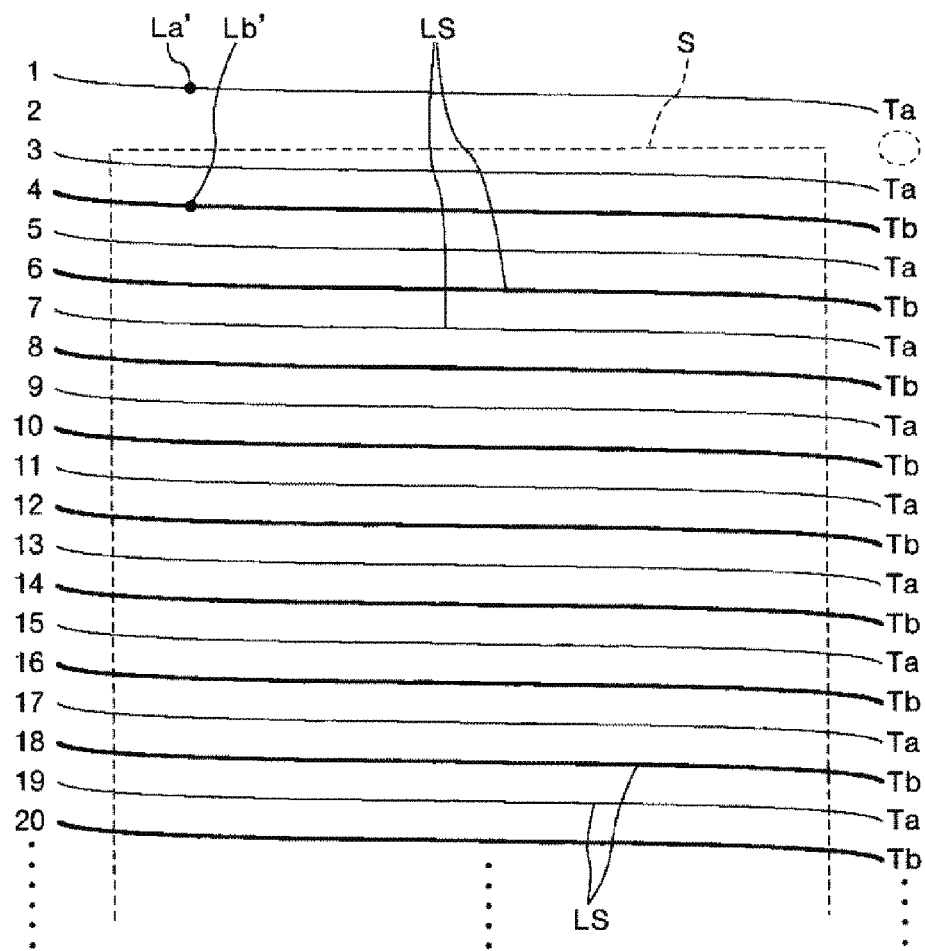
FIG. 8 shows scanning tracks of modulated lights on the image plane.

FIG. 1 shows a schematic configuration of an image display apparatus according to a first embodiment of the invention. FIG. 2 is a perspective view of the image display apparatus shown in FIG. 1. FIG. 3 is a schematic configuration diagram of a display unit of the image display apparatus shown in FIG. 1. FIG. 4 shows a configuration of a light output part included in the display unit. FIG. 5 is a plan view showing a light scanning part included in the display unit. FIGS. 6 to 8 respectively show scanning tracks of modulated lights on an image plane.

An image display apparatus 100 shown in FIG. 1 is a head mounted display (heat mounted image display apparatus). The image display apparatus 100 is a see-through head mounted display having an appearance like spectacles, worn on a head H of an observer for use, and allowing the observer to visually recognize an image as a virtual image superimposed on an outside world image. In the see-through head mounted display, augmented reality display can be provided. Hereinafter, the right side for the observer is also referred to as "right" and the left side is also referred to as "left".

As shown in FIGS. 1 to 3, the image display apparatus 100 has a frame 200 and a display unit 300 for left eye supported by the frame 200.

Further, the display unit 300 has a configuration including a light output part 400, a light scanning part 600, and a deflecting part 700, in which the light output part 400 generates modulated light L modulated based on an image signal, the light scanning part 600 performs spatial (two-dimensional) scanning with the modulated light L, and the deflecting part 700 guides the modulated light L of the scanning to an left eye EY of the observer. According to the configuration, the observer may visually recognize a virtual image according to the image signal.

Note that the image display apparatus 100 of the embodiment is a monocular head mounted display, however, the image display apparatus 100 may be a binocular head mounted display. That is, in addition to the display unit 300 for left eye, a display unit 300 for right eye may be provided.

As below, the respective component elements of the image display apparatus 100 will be sequentially explained in detail.

Frame

As shown in FIG. 1, the frame 200 has a shape like a spectacle frame, and supports the display unit 300. Further, the frame 200 has a front part 210 located in front of the eye EY of the observer, and a pair of temple parts 220, 230 extending from both horizontal ends of the front part 210.

Further, as shown in FIG. 2, the front part 210 has a rim portion 211 and a shade portion 212 and a nose pad 213 supported by the rim portion 211. The shade portion 212 has a function of suppressing transmission of outside world light and supports the deflecting part 700. The nose pad 213 is provided in the center part of the shade portion 212. The nose pad 213 is in contact with a nose NS of the observer when the observer wears the image display apparatus 100 on the head H and supports the image display apparatus 100 with respect to the head H of the observer.

The temple parts 220, 230 connect to the front part 210. Further, the temple parts 220, 230 are straight temple parts without curves for wearing on ears EA of the observer, and have configurations in which the temple parts 220, 230 are partially in contact with the ears EA of the observer when the observer wears the image display apparatus 100 on the head H.

As above, the frame 200 is explained, however, the shape of the frame 200 is not limited to the shown one as long as the frame may be worn on the head H of the observer and support the display unit 300.

Light Output Part

The light output part 400 is contained in the left temple part 220. As shown in FIG. 4, the light output part 400 has a first modulated light generation part 400A and a second modulated light generation part 400B, and a collecting lens that collects modulated lights generated in the first, second modulated light generation parts 400A, 400B. Note that the first, second modulated light generation parts 400A, 400B have the same configuration as each other, and the first modulated light generation part 400A will be representatively explained and the explanation of the second modulated light generation part 400B will be omitted.

The first modulated light generation part 400A has a light source part 410 having light sources 410R, 410G, 410B, drive circuits 420R, 420G, 420B that drive the light sources 410R, 410G, 410B, collimator lenses 470R, 470G, 470B that parallelize the lights output from the light sources 410R, 410G, 410B, a light combining part 430, a light guiding part 460, and a control part 450.

The light source 410R outputs red light, the light source 410G outputs green light, and the light source 410B outputs blue light. These three color lights are used, and thereby, full-color images may be displayed. Note that the light sources 410R, 410G, 410B are not particularly limited, but e.g. laser diodes, LEDs, or the like may be used.

The drive circuit 420R has a function of driving the light source 410R, the drive circuit 420G has a function of driving the light source 410G, and the drive circuit 420B has a function of driving the light source 410B. Further, driving of the drive circuits 420R, 420G, 420B is independently controlled by the control part 450. The three lights output from the light sources 410R, 410G, 410B driven by the drive circuits 420R, 420G, 420B are parallelized by the collimator lenses 470R, 470G, 470B, respectively, and enter the light combining part 430.

The light combining part 430 combines the lights from the plurality of light sources 410R, 410G, 410B. In the embodiment, the light combining part 430 has two dichroic mirrors 431, 432. The dichroic mirror 431 has a function of transmitting red light and reflecting green light and the dichroic mirror 431 has a function of transmitting red light and green light and reflecting blue light. The dichroic mirrors 431, 432 are used, and thereby, three color lights of the red light, the green light, and the blue light from the light sources 410R, 410G, 410B are combined. In this regard, the intensity of the lights from the light sources 410R, 410G, 410B is respectively independently modulated by the control part 450, and thereby, modulated light L having a predetermined color is obtained. Then, the generated modulated light (luminous flux) L is guided to the light guiding part 460 via a coupling lens (not shown) or the like. The light guiding part 460 includes an optical fiber. Note that the light guiding part 460 is not particularly limited as long as the part may propagate the modulated light L like the optical fiber, but may be an optical waveguide or the like.

Further, as shown in FIG. 4, the tips of the light guiding part 460 of the first modulated light generation part 400A and the light guiding part 460 of the second modulated light generation part 400B are fixed in proximity to each other in front of the collecting lens 490. A modulated light La from the first modulated light generation part 400A and a modulated light Lb from the second modulated light generation part 400B are changed into desired NA (numerical apertures) by the collecting lens 490, and then, guided to the light scanning part 600. Note that the collecting lens 490 may be separately provided for the first, second modulated light generation parts 400A, 400B.

Light Scanning Part

The light scanning part 600 is a light scanner provided in the temple part 220 and performing spatial (two-dimensional) scanning with the modulated lights La, Lb that have passed through the collecting lens 490 toward the deflecting part 700.

The light scanning part 600 is a light scanner that can swing about two axes, and has a movable portion 610 having a mirror (light reflection portion) 611, axial portions 621, 622 that swingably (rotatably) support the movable portion 610 about an axis J1, a drive frame portion 630 that supports the axial portions 621, 622, axial portions 641, 642 that swingably (rotatably) support the drive frame portion 630 about an axis J2 orthogonal to the axis J1, a frame-like supporting portion 650 that supports the axial portions 641, 642, and driving means (not shown) for swinging the movable portion 610 about the axis J1 with respect to the drive frame portion 630 while swinging the drive frame portion 630 about the axis J2 with respect to the supporting portion 650 as shown in FIG. 5. According to the configuration, the movable portion 610 swings about both axes of the axes J1, J2, and thereby, two-dimensional scanning may be performed in both directions of first directions (horizontal directions) about the axis J1 and second directions (vertical directions) about the axis J2 with the modulated lights La, Lb reflected by the mirror 611.

Further, in the light scanning part 600, a first frequency f1 of scanning with the modulated lights La, Lb in the first directions is higher than a second frequency f2 of scanning with the modulated lights La, Lb in the second directions. Accordingly, scanning with the modulated lights La, Lb is performed at a plurality of times in the first directions while single scanning is performed in the second directions. Note that the first frequency f1 and the second frequency f2 are not particularly limited, but, for example, the first frequency f1 may be from 10 to 40 kHz and the second frequency may be from 30 to 120 kHz. Furthermore, the respective modulated light generation parts 400A, 400B output the modulated lights La, Lb at swinging toward one side of the swing about the axis J1, but do not output the modulated lights La, Lb at swinging toward the other side. Accordingly, in the light scanning part 600, scanning with the modulated lights La, Lb is performed at swinging toward one side of the swing about the axis J1, but scanning with the modulated lights La, Lb is not performed at swinging toward the other side. That is, scanning with the modulated lights La, Lb is performed only in ones of outward paths and return paths in the first directions.

As described above, the light scanner swingable about two axes is used as the light scanning part 600, and thereby, the configuration and the arrangement (particularly, alignment) of the light scanning part 600 may be simpler and the light scanning part 600 may be downsized. Note that the configuration of the light scanning part 600 is not particularly limited to the configuration of the embodiment as long as two-dimensional scanning with the modulated lights La, Lb may be performed. For example, the light scanning part 600 may include two light scanners that perform one-dimensional scanning with the modulated lights La, Lb or have a configuration using a galvano mirror in place of the light scanner.

Deflecting Part

The deflecting part 700 is provided in the shade portion 212 as shown in FIG. 2, and provided to be located in front of the left eye EY of the observer when used as shown in FIG. 3. The deflecting part 700 has a sufficient size to cover the left eye EY of the observer, and has a function of allowing the modulated lights La, Lb of the scanning by the light scanning part 600 as image lights to enter the left eye EY of the observer. The deflecting part 700 includes e.g. a hologram element (hologram mirror) as one of diffraction gratings. The hologram element is a semi-transmissive film having a property of diffracting a light in a specific wavelength band and transmitting lights in the other wavelength bands. Thereby, the observer may visually recognize an image formed by the image lights while visually recognizing an outside world image. Namely, a see-through head mounted display may be realized. The configuration of the deflecting part 700 is not limited to the hologram element as long as the part may exert the above described effect, but may be e.g. an aspherical half-mirror.

As above, the configuration of the image display apparatus 100 is briefly explained. Next, a scanning method with the modulated lights La, Lb will be explained in detail.

FIG. 6 shows scanning tracks Ta, Tb of the modulated lights La, Lb on an image plane. Here, the image plane is a plane on which an image is formed by the image display apparatus. In other words, the image plane is a plane on which the modulated lights La, Lb of the scanning by the light scanning part 600 form an image. In the case of an image display apparatus that directly draws an image on the retina of the observer like the embodiment, the image plane is formed on the retina of the observer. Further, in the case of an image display apparatus like a projector, the image plane is formed on a screen. As described above, in the image display apparatus 100, scanning with the modulated lights La, Lb is performed in ones of outward paths and return paths in the first directions, and the scanning tracks Ta, Tb are as shown in FIG. 6. Note that, hereinafter, lines arranged at equal intervals in the second directions are referred to as "scanning lines LS" and the respective scanning tracks Ta, Tb are formed on the scanning lines LS. Further, the plurality of scanning lines LS are sequentially referred to from the top as "LS1 (first scanning line)", "LS2 (second scanning line)", "LS3 (third scanning line)" . . . . Note that, in the embodiment, in an image display area S visually recognized as an image by the observer (the details will be described later), the scanning lines LS correspond to horizontal scanning lines for image display.

As shown in FIG. 6, the scanning tracks Ta are located on the odd-numbered scanning lines LS1, LS3, LS5 . . . and the scanning tracks Tb are located on the even-numbered scanning lines LS2, LS4, LS6 . . . . That is, scanning with the modulated lights La, Lb is performed for two (the number of modulated lights) scanning lines LS at a time, and the scanning tracks Ta, Tb are alternately located sequentially from the scanning line LS1 without overlapping with each other. Further, irradiated points La', Lb' as points irradiated with the modulated lights La, Lb at a certain time are arranged side by side in the second directions, and scanning with the modulated lights La, Lb is performed in the first directions and the second directions with the position relationship maintained. Note that the irradiated points La', Lb' are not necessarily arranged side by side in the second directions, but may be provided so that the respective scanning tracks Ta, Tb may be arranged in the second directions. For example, the irradiated points La', Lb' may be arranged in directions crossing the first directions.

On this account, regardless of times (in other words, the attitude of the movable portion 610), the irradiated point La' is located in a position different from that of (not overlapping with) the scanning track Tb, and the irradiated point Lb' is located in a position different from that of the scanning track Ta. Further, assuming that scanning with the modulated lights La, Lb is performed on the $m_1$th and $m_2$th ($m_1$ and $m_2$ are natural numbers) scanning lines LS, respectively, from the top of the image plane, remainders of $m_1/2$ and $m_2/2$ ($m_1$, $m_2$/number of modulated lights) are different from each other. In the case of the embodiment, scanning with the modulated light La is performed on the odd-numbered scanning line LS and the above remainder is "1", and scanning with the modulated light Lb is performed on the even-numbered scanning line LS and the above remainder is "0".

According to the configuration, compared to the case of a single modulated light, the scanning lines LS may be doubled without change in drive frequency for the light scanning part 600 in the first directions. Therefore, even in the case where it is hard to increase the drive frequency because of the structure of the light scanning part 600, images with higher resolution may be displayed without being affected by the structure of the light scanning part 600. Further, the scanning lines LS do not cross each other and are arranged at equal intervals in the second directions in any part (the center part or both end parts) in the first directions. Accordingly, images with uniform pixel density and less uneven brightness may be displayed.

Further, in the embodiment, the irradiated points La', Lb' at a certain time are located on the scanning lines LS lying next to each other. Accordingly, a width in the second directions of the image display area S that can be used for actual image display (an area in which the scanning tracks Ta, Tb are alternately arranged on the adjacent scanning lines LS) (in other words, a width to the whole width scanned in the second directions by the light scanning part 600) may be secured to be wider compared to e.g. the case shown in FIG. 8, which will be described later. The output surfaces of the light guiding parts 460 of the first, second modulated light generation parts 400A, 400B (the end surfaces from which the modulated lights La, Lb are output) may be provided to be closer to each other by the reduced amount of the separation distance between the irradiated points La', Lb', and thereby, the light output part 400 may be downsized.

Note that, in both end portions of the respective scanning lines LS, the scanning speed is lower and distortion in the vertical directions (second directions) is larger than those in the center portion, and it is preferable not to use the end portions as the image display area S. The image display area S is set as shown in FIG. 6, and thereby, more homogeneous images with higher accuracy may be displayed. Further, in the embodiment, the scanning lines LS extend at tilts with respect to the horizontal directions (first directions), and, for example, the light scanning part 600 may be provided at a slight tilt so that the scanning lines LS may extend in the horizontal directions as shown in FIG. 7. Thereby, images at less tilts may be displayed.

Furthermore, in the embodiment, the irradiated points La', Lb' at the respective times are located on the scanning lines LS lying next to each other. Accordingly, none of the scanning lines LS is located between the irradiated points La', Lb' (in other words, the scanning lines LS are not located). However, the number of scanning lines LS located between the irradiated points La', Lb' is not particularly limited unless the scanning tracks Ta, Tb overlap, but may be set to a number that satisfies a relationship of 2N (N is an integer equal to or more than zero). As an example, FIG. 8 shows the case of 2N (N=1).

Here, as N is larger, the separation distance between the irradiated points La', Lb' is larger, and the output surfaces of the light guiding parts 460 of the first, second modulated light generation parts 400A, 400B may be provided apart.

Accordingly, for example, in the case where it is impossible to provide the light guiding parts 460 close to each other as in the embodiment due to a physical problem of the sizes of the light guiding parts 460 (diameters of the optical fibers), the problem may be solved by increasing N. Note that, as N is larger, the image display area S is smaller (in FIG. 8, it is impossible to use the scanning lines LS1, LS2 on the upside), and it is preferable to set N to be smaller as long as the physical problem may be solved.

Second Embodiment

Figure 9:
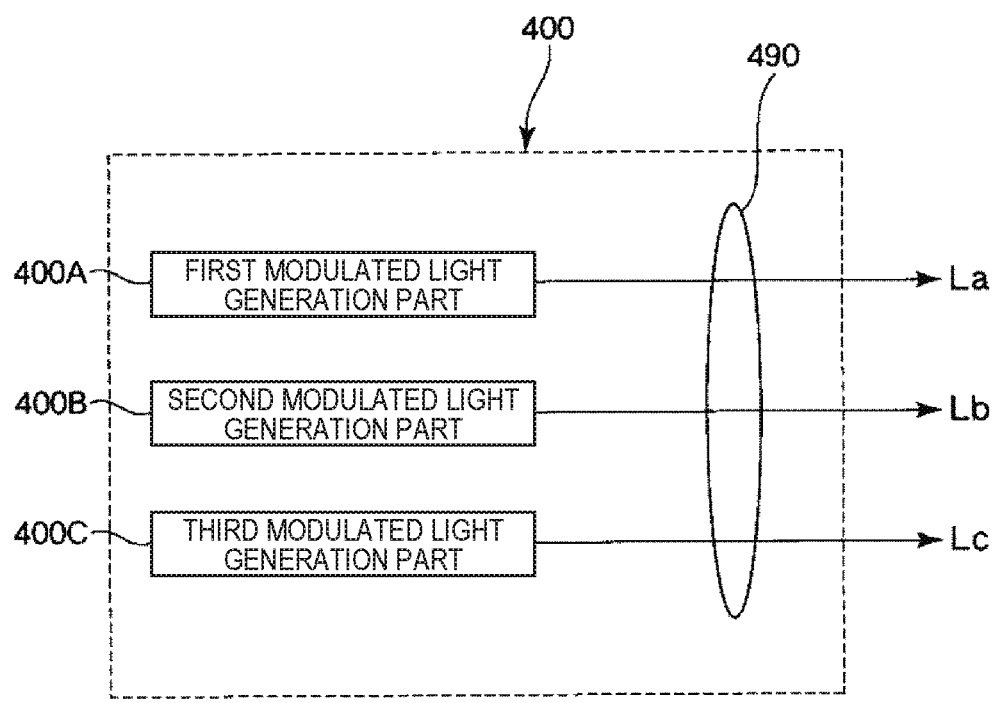
FIG. 9 shows a configuration of a light output part of an image display apparatus according to a second embodiment of the invention.
Figure 10:
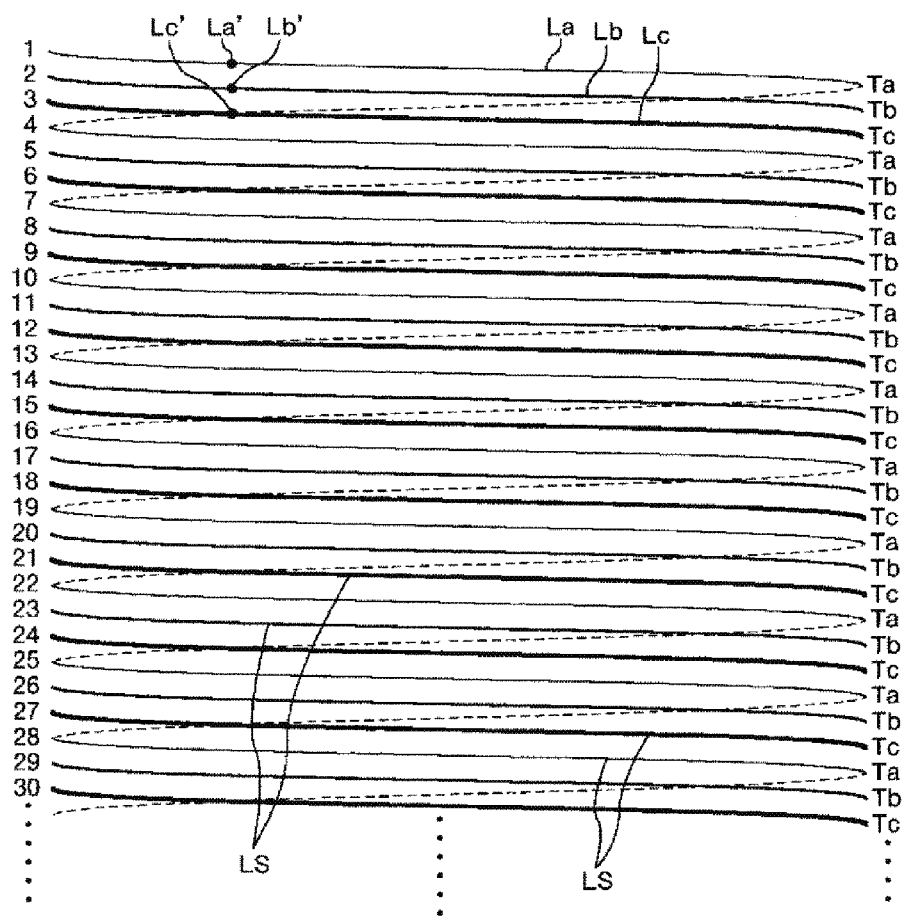
FIG. 10 shows scanning tracks of modulated lights on an image plane.
Figure 11:
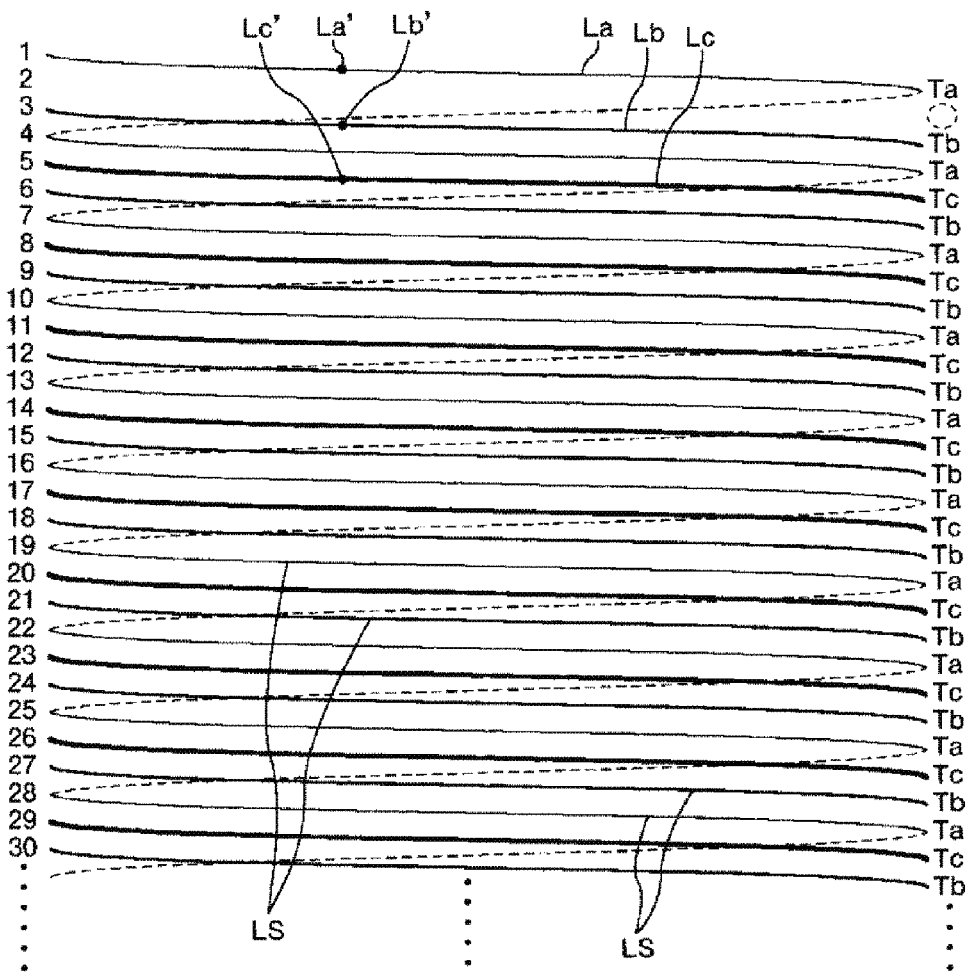
FIG. 11 shows scanning tracks of modulated lights on the image plane.
Figure 12:
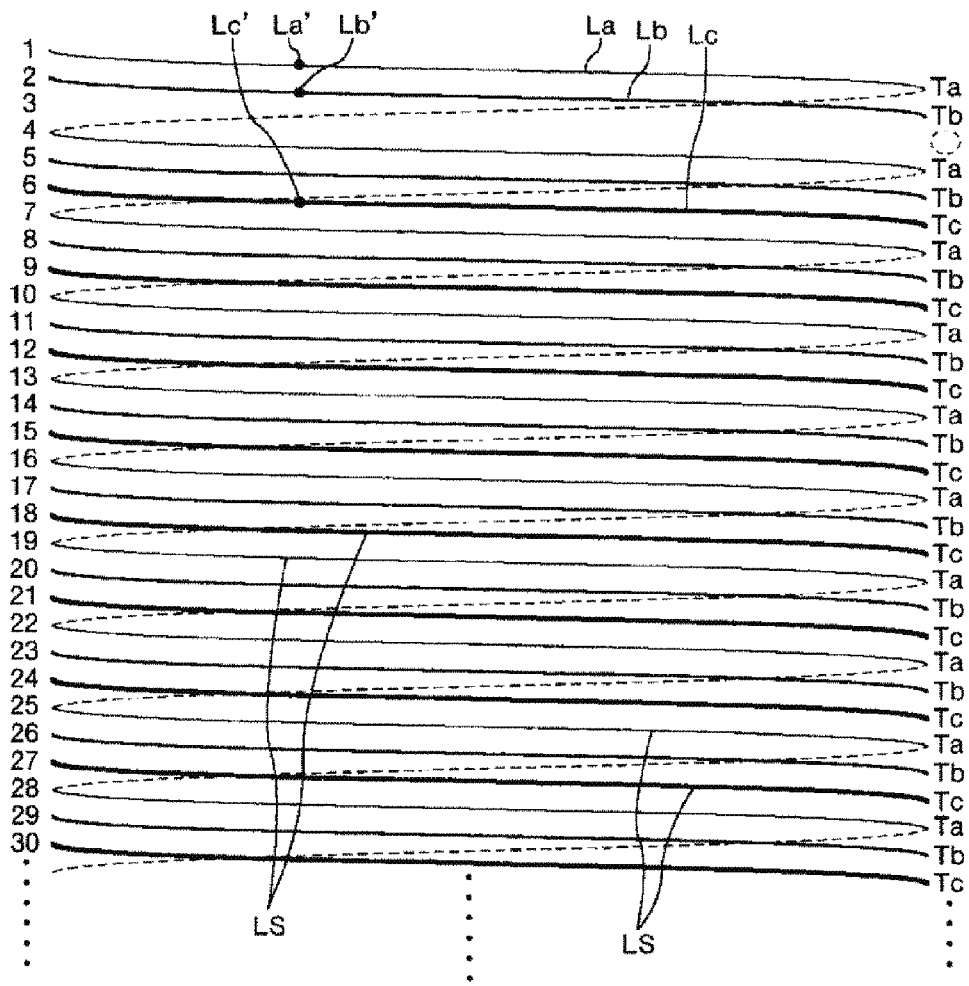
FIG. 12 shows scanning tracks of modulated lights on the image plane.

FIG. 9 shows a configuration of a light output part of an image display apparatus according to a second embodiment of the invention. FIGS. 10 to 12 respectively show scanning tracks of modulated lights on an image plane.

As below, the image display apparatus according to the second embodiment of the invention will be explained, and the explanation will be made with a focus on differences from the above described embodiment and the explanation of the same items will be omitted.

The image display apparatus of the second embodiment is the same as the above described first embodiment except that the configuration of the light output part is different. The same configurations as those of the above described embodiment have the same signs.

As shown in FIG. 9, a light output part 400 of the embodiment has a first modulated light generation part 400A, a second modulated light generation part 400B, and a third modulated light generation part 400C. The third modulated light generation part 400C has the same configuration as the first modulated light generation part 400A. Hereinafter, modulated light L generated in the third modulated light generation part 400C is referred to as "modulated light Lc".

Next, a scanning method of the modulated lights La, Lb, Lc will be explained in detail.

FIG. 10 shows scanning tracks Ta, Tb, Tc of modulated lights La, Lb, Lc on the image plane. As shown in the drawing, the scanning tracks Ta are located on (1+3q)th (q is an integer equal to or more than zero) scanning lines LS1, LS4, LS7 . . . , the scanning tracks Tb are located on (2+3q)th scanning lines LS2, LS5, LS8 . . . , and the scanning tracks Tc are located on (3+3q)th scanning lines LS3, LS6, LS9 . . . . That is, scanning with the modulated lights La, Lb, Lc is performed for three scanning lines LS at a time, and the scanning tracks Ta, Tb, Tc are alternately located sequentially from the scanning line LS1 without overlapping with one another. Further, irradiated points La', Lb', Lc' of the modulated lights La, Lb, Lc at a certain time are arranged side by side in the second directions, and scanning with the modulated lights La, Lb, Lc is performed in the first directions and the second directions with the position relationship maintained. Note that the irradiated points La', Lb', Lc' may be arranged in directions crossing the first directions.

On this account, regardless of times (in other words, the attitude of the movable portion 610), the irradiated point La' is located in a position different from those of the scanning tracks Tb, Tc, the irradiated point Lb' is located in a position different from those of the scanning tracks Ta, Tc, and the irradiated point Lc' is located in a position different from those of the scanning tracks Ta, Tb. Further, assuming that scanning with the three modulated lights La, Lb, Lc is performed on the $m_1$th, $m_2$th, $m_3$th ($m_1$ to $m_3$ are natural numbers) scanning lines LS, respectively, from the top of the image plane, remainders of division of the respective $m_1$ to $m_3$ by the number of modulated lights "3" are different from one another. In the case of the embodiment, the remainder is "1" for the modulated light La, the remainder is "2" for the modulated light Lb, and the remainder is "0" for the modulated light Lc.

According to the second embodiment, the same advantages as those of the above described first embodiment may be obtained.

Note that, in the embodiment, the irradiated points La', Lb', Lc' at the respective times are located on the scanning lines LS lying next to each other. Accordingly, none of the scanning lines LS is located between the irradiated points La' and Lb' and between the irradiated points Lb' and Lc'. However, the numbers of scanning lines LS located between the irradiated points La' and Lb' and between the irradiated points Lb' and Lc' are not particularly limited unless the scanning tracks Ta, Tb, Tc overlap. As below, the numbers will be explained by taking examples.

First, the case where the irradiated points La', Lb', Lc' are arranged at equal intervals in the second directions and the same numbers of scanning lines LS are located between the irradiated points La' and Lb' and between the irradiated points Lb' and Lc' will be explained. In this case, the numbers of scanning lines LS located between the irradiated points La' and Lb' and between the irradiated points Lb' and Lc' are not particularly limited if the numbers satisfy a relationship of 3N or 3N+1 (N is an integer equal to or more than zero). As an example, FIG. 11 shows the case of 3N+1 (N=0). As shown in the drawing, the scanning tracks Ta are located on (1+3q)th (q is an integer equal to or more than zero) scanning lines LS1, LS4, LS7, LS10 . . . , the scanning tracks Tb are located on (3+3q)th scanning lines LS3, LS6, LS9 . . . , and the scanning tracks Tc are located on (5+3q)th scanning lines LS5, LS8, LS11 . . . . According to the configuration, the same advantages as those of the embodiment may be obtained. Further, the separation distances between the irradiated points La', Lb', Lc' are larger than those of the embodiment, and thereby, the output surfaces of the light guiding parts 460 of the first, second, third modulated light generation parts 400A, 400B, 400C may be provided apart. Further, the irradiated points La', Lb', Lc' are located at equal intervals, and thereby, the arrangement and the alignment of the light guiding parts 460 of the first, second, third modulated light generation parts 400A, 400B, 400C may be easier.

Next, the case where the irradiated points La', Lb', Lc' are irregularly arranged in the second directions and different numbers of scanning lines LS are located between the irradiated points La' and Lb' and between the irradiated points Lb' and Lc' will be explained. FIG. 12 shows an example of the case. As shown in the drawing, the scanning tracks Ta are located on (1+3q)th (q is an integer equal to or more than zero) scanning lines LS1, LS4, LS7, LS10 . . . , the scanning tracks Tb are located on (2+3q)th scanning lines LS2, LS5, LS8, LS11 . . . , and the scanning tracks Tc are located on (6+3q)th scanning lines LS6, LS9, LS12 . . . . As described above, in the modified example, the irradiated points La', Lb' are located on the adjacent scanning lines LS, however, the irradiated points Lb', Lc' are not located on the adjacent scanning lines LS. According to the configuration, the same advantages as those of the embodiment may be obtained.

Third Embodiment

Figure 13:
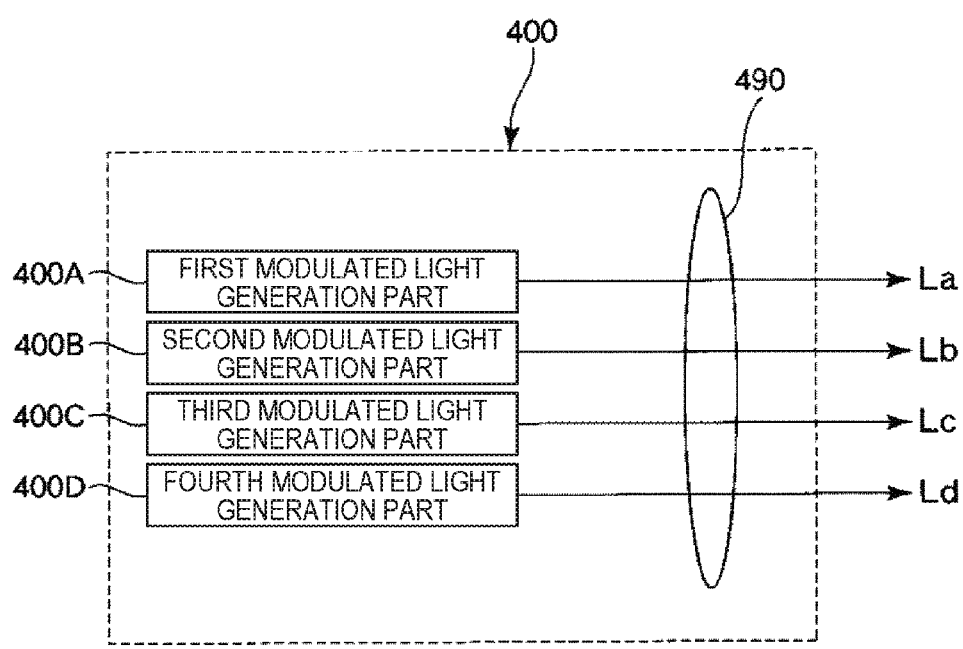
FIG. 13 shows a configuration of a light output part of an image display apparatus according to a third embodiment of the invention.
Figure 14:
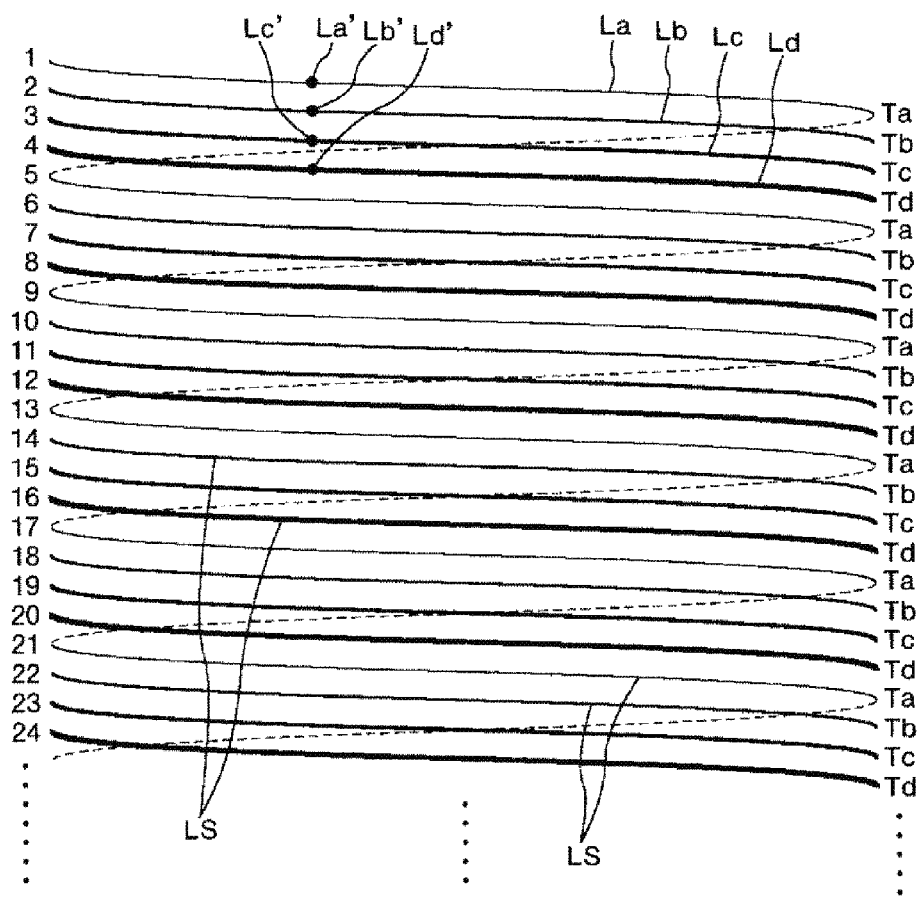
FIG. 14 shows scanning tracks of modulated lights on an image plane.
Figure 15:
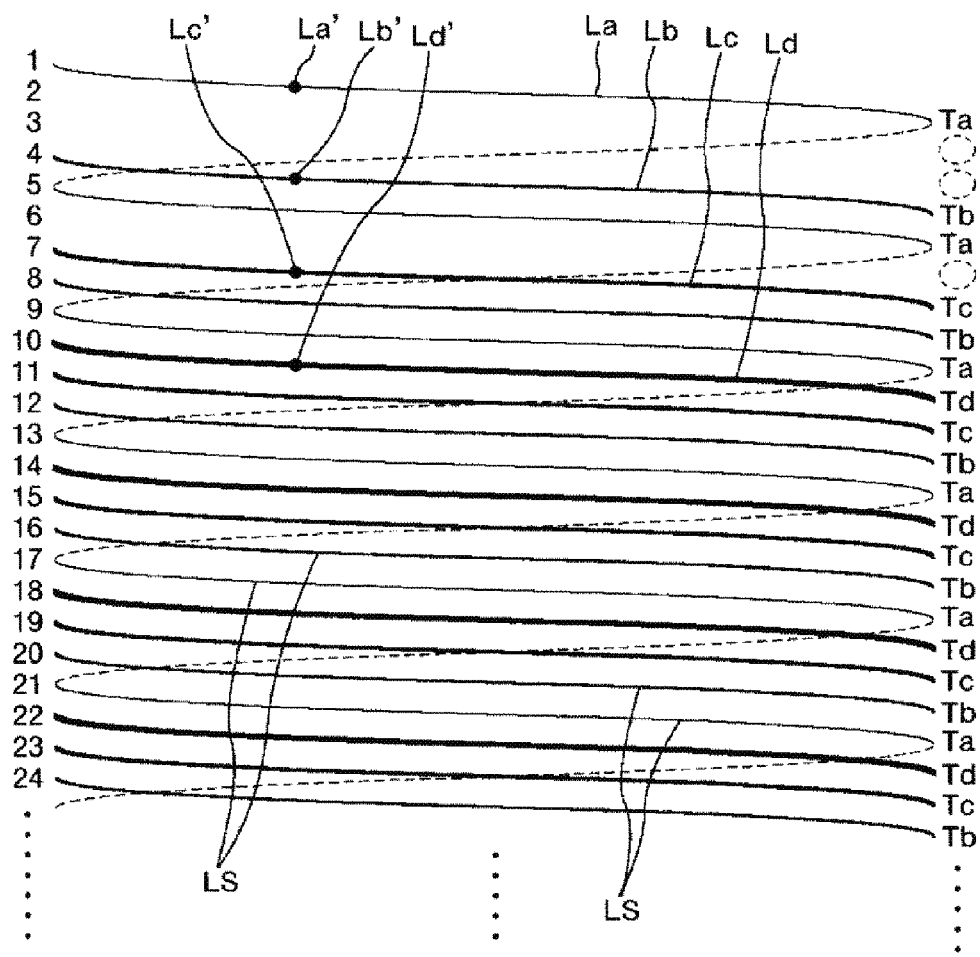
FIG. 15 shows scanning tracks of modulated lights on the image plane.

FIG. 13 shows a configuration of a light output part of an image display apparatus according to a third embodiment of the invention. FIGS. 14 and 15 respectively show scanning tracks of modulated lights on an image plane.

As below, the image display apparatus according to the third embodiment of the invention will be explained, and the explanation will be made with a focus on differences from the above described embodiments and the explanation of the same items will be omitted.

The image display apparatus of the third embodiment is the same as the above described first embodiment except that the configuration of the light output part is different. The same configurations as those of the above described embodiments have the same signs.

As shown in FIG. 13, a light output part 400 of the embodiment has a first modulated light generation part 400A, a second modulated light generation part 400B, a third modulated light generation part 400C, and a fourth modulated light generation part 400D. The fourth modulated light generation part 400D has the same configuration as the first modulated light generation part 400A. Hereinafter, modulated light L generated in the fourth modulated light generation part 400D is referred to as "modulated light Ld".

Next, a scanning method of the modulated lights La, Lb, Lc, Ld will be explained in detail.

FIG. 14 shows scanning tracks Ta, Tb, Tc, Td of modulated lights La, Lb, Lc, Ld on the image plane. As shown in the drawing, the scanning tracks Ta are located on (1+4q)th (q is an integer equal to or more than zero) scanning lines LS1, LS5, LS9 . . . , the scanning tracks Tb are located on (2+4q)th scanning lines LS2, LS6, LS10 . . . , the scanning tracks Tc are located on (3+4q)th scanning lines LS3, LS7, LS11 . . . , and the scanning tracks Td are located on (4+4q)th scanning lines LS4, LS8, LS12 . . . . That is, scanning with the modulated lights La, Lb, Lc, Ld is performed for four scanning lines LS at a time, and the scanning tracks Ta, Tb, Tc, Td are alternately located sequentially from the scanning line LS1 without overlapping with one another. Further, irradiated points La', Lb', Lc', Ld' of the modulated lights La, Lb, Lc, Ld at a certain time are arranged side by side in the second directions, and scanning with the modulated lights La, Lb, Lc, Ld is performed in the first directions and the second directions with the position relationship maintained. Note that the irradiated points La', Lb', Lc', Ld' may be arranged in directions crossing the first directions.

On this account, regardless of times (in other words, the attitude of the movable portion 610), the irradiated point La' is located in a position different from those of the scanning tracks Tb, Tc, Td, the irradiated point Lb' is located in a position different from those of the scanning tracks Ta, Tc, Td, the irradiated point Lc' is located in a position different from those of the scanning tracks Ta, Tb, Td, and the irradiated point Ld' is located in a position different from those of the scanning tracks Ta, Tb, Tc. Further, assuming that scanning with the four modulated lights La, Lb, Lc, Ld is performed on the $m_1$th to $m_4$th ($m_1$ to $m_4$ are natural numbers) scanning lines LS, respectively, from the top of the image plane, remainders of division of the respective $m_1$ to $m_4$ by the number of modulated lights "4" are different from one another. In the case of the embodiment, the remainder is "1" for the modulated light La, the remainder is "2" for the modulated light Lb, the remainder is "3" for the modulated light Lc, and the remainder is "0" for the modulated light Ld.

According to the third embodiment, the same advantages as those of the above described first embodiment may be obtained.

Note that, in the embodiment, the irradiated points La', Lb', Lc', Ld' at the respective times are located on the scanning lines LS lying next to each other. Accordingly, none of the scanning lines LS is located between the irradiated points La' and Lb', between the irradiated points Lb' and Lc', and between the irradiated points Lc' and Ld'. However, the numbers of scanning lines LS located between the irradiated points are not particularly limited unless the scanning tracks Ta, Tb, Tc, Td overlap with one another.

For example, in the case where the irradiated points La', Lb', Lc', Ld' are arranged at equal intervals in the second directions and the same numbers of scanning lines LS are located between the irradiated points, the numbers of scanning lines LS located between the irradiated points may satisfy a relationship of 4N or 4N+2 (N is an integer equal to or more than zero). As an example, FIG. 15 shows the case of 4N+2 (N=0). As shown in the drawing, the scanning tracks Ta are located on (1+4q)th (q is an integer equal to or more than zero) scanning lines LS1, LS5, LS9, LS13, LS17 . . . , the scanning tracks Tb are located on (4+4q) th scanning lines LS4, LS8, LS12, LS16 . . . , the scanning tracks Tc are located on (7+4q)th scanning lines LS7, LS11, LS15 . . . , and the scanning tracks Td are located on (10+4q)th scanning lines LS10, LS14, LS18 . . . . According to the configuration, the same advantages as those of the embodiment may be obtained.

Fourth Embodiment

Figure 16:
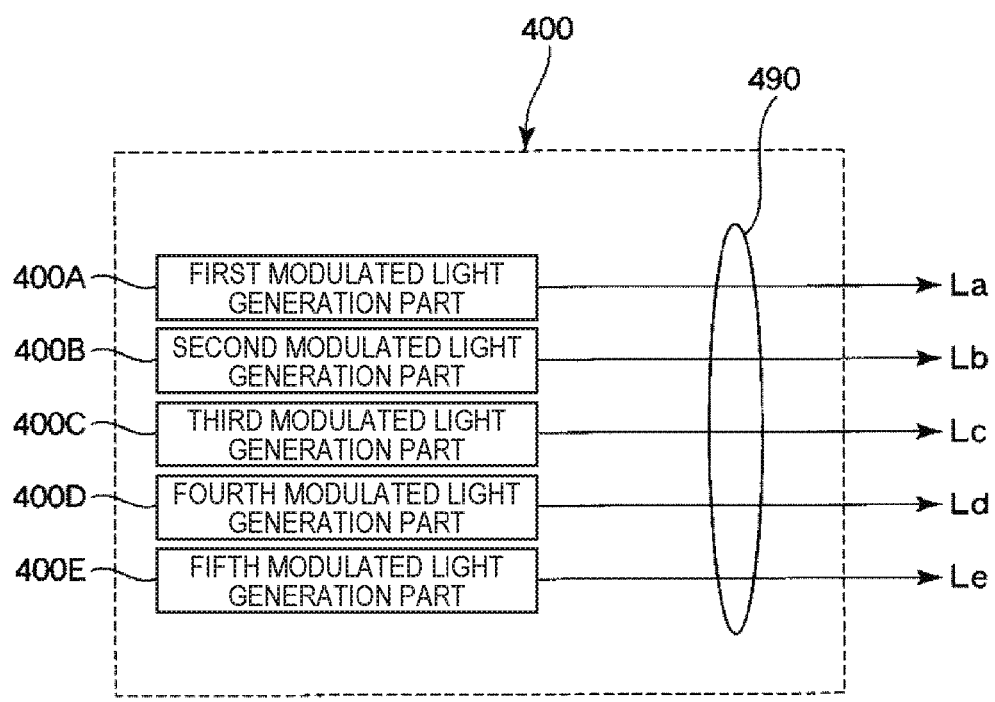
FIG. 16 shows a configuration of a light output part of an image display apparatus according to a fourth embodiment of the invention.
Figure 17:
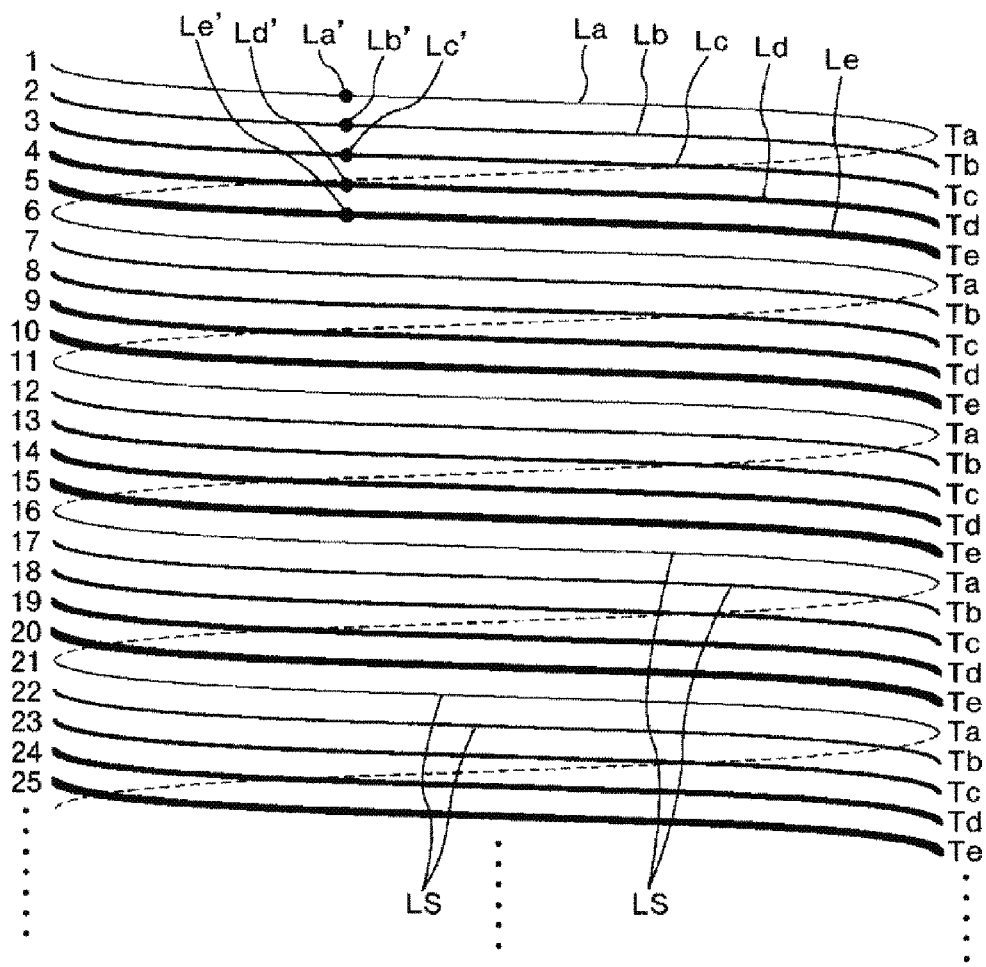
FIG. 17 shows scanning tracks of modulated lights on an image plane.

FIG. 16 shows a configuration of a light output part of an image display apparatus according to a fourth embodiment of the invention. FIG. 17 shows scanning tracks of modulated lights on an image plane.

As below, the image display apparatus according to the fourth embodiment of the invention will be explained, and the explanation will be made with a focus on differences from the above described embodiments and the explanation of the same items will be omitted.

The image display apparatus of the fourth embodiment is the same as the above described first embodiment except that the configuration of the light output part is different. The same configurations as those of the above described embodiment have the same signs.

As shown in FIG. 16, a light output part 400 of the embodiment has a first modulated light generation part 400A, a second modulated light generation part 400B, a third modulated light generation part 400C, a fourth modulated light generation part 400D, and a fifth modulated light generation part 400E. The fifth modulated light generation part 400E has the same configuration as the first modulated light generation part 400A. Hereinafter, modulated light L generated in the fifth modulated light generation part 400E is referred to as "modulated light Le".

Next, a scanning method of the modulated lights La, Lb, Lc, Ld, Le will be explained in detail.

FIG. 17 shows scanning tracks Ta, Tb, Tc, Td, Te of modulated lights La, Lb, Lc, Ld, Le on the image plane. As shown in the drawing, the scanning tracks Ta are located on (1+5q)th (q is an integer equal to or more than zero) scanning lines LS1, LS6, LS11 . . . , the scanning tracks Tb are located on (2+5q)th scanning lines LS2, LS7, LS12 . . . , the scanning tracks Tc are located on (3+5q)th scanning lines LS3, LS8, LS13 . . . , the scanning tracks Td are located on (4+5q)th scanning lines LS4, LS9, LS14 . . . , and the scanning tracks Te are located on (5+5q)th scanning lines LS5, LS10, LS15 . . . . That is, scanning with the modulated lights La, Lb, Lc, Ld, Le is performed for five scanning lines LS at a time, and the scanning tracks Ta, Tb, Tc, Td, Te are alternately located sequentially from the scanning line LS1 without overlapping with one another. Further, irradiated points La', Lb', Lc', Ld', Le' of the modulated lights La, Lb, Lc, Ld, Le at a certain time are arranged side by side in the second directions, and scanning with the modulated lights La, Lb, Lc, Ld, Le is performed in the first directions and the second directions with the position relationship maintained. Note that the irradiated points La', Lb', Lc', Ld', Le' may be arranged in directions crossing the first directions.

On this account, regardless of times (in other words, the attitude of the movable portion 610), the irradiated point La' is located in a position different from those of the scanning tracks Tb, Tc, Td, Te, the irradiated point Lb' is located in a position different from those of the scanning tracks Ta, Tc, Td, Te, the irradiated point Lc' is located in a position different from those of the scanning tracks Ta, Tb, Td, Te, the irradiated point Ld' is located in a position different from those of the scanning tracks Ta, Tb, Tc, Te, and the irradiated point Le' is located in a position different from those of the scanning tracks Ta, Tb, Tc, Td. Further, assuming that scanning with the five modulated lights La to Le is performed on the $m_1$th to $m_5$th ($m_1$ to $m_5$ are natural numbers) scanning lines LS, respectively, from the top of the image plane, remainders of division of the respective $m_1$ to $m_5$ by the number of modulated lights "5" are different from one another among the modulated lights La to Le. In the case of the embodiment, the remainder is "1" for the modulated light La, the remainder is "2" for the modulated light Lb, the remainder is "3" for the modulated light Lc, the remainder is "4" for the modulated light Ld, and the remainder is "0" for the modulated light Le.

According to the fourth embodiment, the same advantages as those of the above described first embodiment may be obtained.

Note that, in the embodiment, the irradiated points La', Lb', Lc', Ld', Le' at the respective times are located on the scanning lines LS lying next to each other. Accordingly, none of the scanning lines LS is located between the irradiated points La' and Lb', between the irradiated points Lb' and Lc', between the irradiated points Lc' and Ld', and between the irradiated points Ld' and Le'. However, the numbers of scanning lines LS located between the irradiated points are not particularly limited unless the scanning tracks Ta, Tb, Tc, Td, Te overlap with one another. For example, in the case where the irradiated points La', Lb', Lc', Ld', Le' are arranged at equal intervals in the second directions and the same numbers of scanning lines LS are respectively located between the irradiated points, the numbers of scanning lines LS located between the irradiated points may satisfy a relationship of 5N, 5N+1, 5N+2, or 5N+3 (N is an integer equal to or more than zero).

Fifth Embodiment

Figure 18:
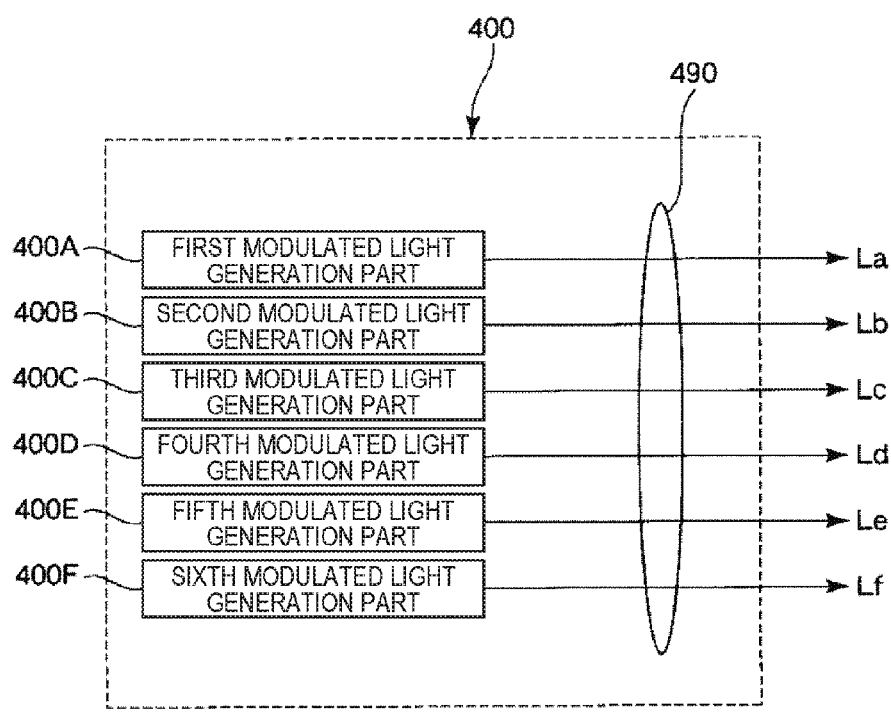
FIG. 18 shows a configuration of a light output part of an image display apparatus according to a fifth embodiment of the invention.
Figure 19:
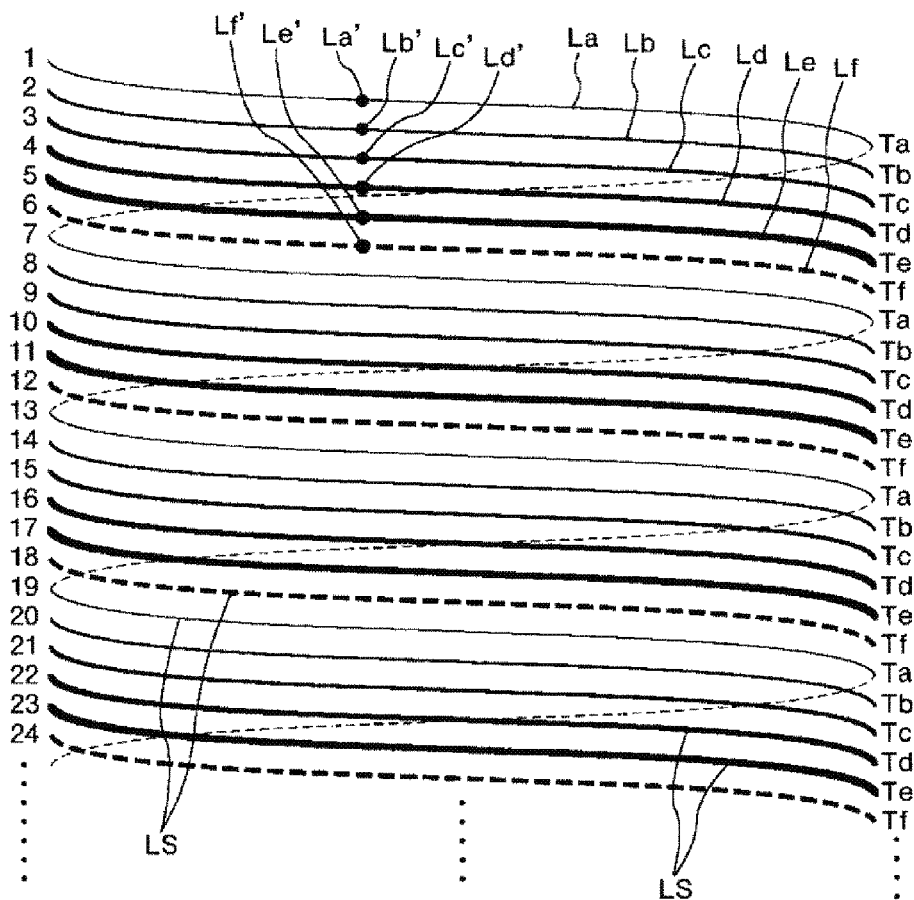
FIG. 19 shows scanning tracks of modulated lights on an image plane.

FIG. 18 shows a configuration of a light output part of an image display apparatus according to a fifth embodiment of the invention. FIG. 19 shows scanning tracks of modulated lights on an image plane.

As below, the image display apparatus according to the fifth embodiment of the invention will be explained, and the explanation will be made with a focus on differences from the above described embodiments and the explanation of the same items will be omitted.

The image display apparatus of the fifth embodiment is the same as the above described first embodiment except that the configuration of the light output part is different. The same configurations as those of the above described embodiment have the same signs.

As shown in FIG. 18, a light output part 400 of the embodiment has a first modulated light generation part 400A, a second modulated light generation part 400B, a third modulated light generation part 400C, a fourth modulated light generation part 400D, a fifth modulated light generation part 400E, and a sixth modulated light generation part 400F. The sixth modulated light generation part 400F has the same configuration as the first modulated light generation part 400A. Hereinafter, modulated light L generated in the sixth modulated light generation part 400F is referred to as "modulated light Lf".

Next, a scanning method of the modulated lights La, Lb, Lc, Ld, Le, Lf will be explained in detail.

FIG. 19 shows scanning tracks Ta, Tb, Tc, Td, Te, Tf of modulated lights La, Lb, Lc, Ld, Le, Lf on the image plane. As shown in the drawing, the scanning tracks Ta are located on (1+6q)th (q is an integer equal to or more than zero) scanning lines LS1, LS7, LS13 . . . , the scanning tracks Tb are located on (2+6q)th scanning lines LS2, LS8, LS14 . . . , the scanning tracks Tc are located on (3+6q)th scanning lines LS3, LS9, LS15 . . . , the scanning tracks Td are located on (4+6q)th scanning lines LS4, LS10, LS16 . . . , the scanning tracks Te are located on (5+6q)th scanning lines LS5, LS11, LS17 . . . , and the scanning tracks Tf are located on (6+6q)th scanning lines LS6, LS12, LS18 . . . . That is, scanning with the modulated lights La, Lb, Lc, Ld, Le, Lf is performed for six scanning lines LS at a time, and the scanning tracks Ta, Tb, Tc, Td, Te, Tf are alternately located sequentially from the scanning line LS1 without overlapping with one another. Further, irradiated points La', Lb', Lc', Ld', Le', Lf' of the modulated lights La, Lb, Lc, Ld, Le, Lf at a certain time are arranged side by side in the second directions, and scanning with the modulated lights La, Lb, Lc, Ld, Le, Lf is performed in the first directions and the second directions with the position relationship maintained. Note that the irradiated points La', Lb', Lc', Ld', Le', Lf' may be arranged in directions crossing the first directions.

On this account, regardless of times (in other words, the attitude of the movable portion 610), the irradiated point La' is located in a position different from those of the scanning tracks Tb, Tc, Td, Te, Tf, the irradiated point Lb' is located in a position different from those of the scanning tracks Ta, Tc, Td, Te, Tf, the irradiated point Lc' is located in a position different from those of the scanning tracks Ta, Tb, Td, Te, Tf, the irradiated point Ld' is located in a position different from those of the scanning tracks Ta, Tb, Tc, Te, Tf, the irradiated point Le' is located in a position different from those of the scanning tracks Ta, Tb, Tc, Td, Tf, and the irradiated point Lf' is located in a position different from those of the scanning tracks Ta, Tb, Tc, Td, Te. Further, assuming that scanning with the six modulated lights La to Lf is performed on the $m_1$th to $m_6$th ($m_1$ to $m_6$ are natural numbers) scanning lines LS, respectively, from the top of the image plane, remainders of division of the respective $m_1$ to $m_6$ by the number of modulated lights "6" are different from one another. In the case of the embodiment, the remainder is "1" for the modulated light La, the remainder is "2" for the modulated light Lb, the remainder is "3" for the modulated light Lc, the remainder is "4" for the modulated light Ld, the remainder is "5" for the modulated light Le, and the remainder is "0" for the modulated light Lf.

According to the fifth embodiment, the same advantages as those of the above described first embodiment may be obtained.

Note that, in the embodiment, the irradiated points La', Lb', Lc', Ld', Le', Lf' at the respective times are located on the scanning lines LS lying next to each other. Accordingly, none of the scanning lines LS is located between the irradiated points La' and Lb', between the irradiated points Lb' and Lc', between the irradiated points Lc' and Ld', between the irradiated points Ld' and Le', and between the irradiated points Le' and Lf'. However, the numbers of scanning lines LS located between the irradiated points are not particularly limited unless the scanning tracks Ta, Tb, Tc, Td, Te, Tf overlap with one another. For example, in the case where the irradiated points La', Lb', Lc', Ld', Le', Lf' are arranged at equal intervals in the second directions and the same numbers of scanning lines LS are respectively located between the irradiated points, the numbers of scanning lines LS located between the irradiated points may satisfy a relationship of 6N or 6N+4 (N is an integer equal to or more than zero).

Sixth Embodiment

Figure 20:
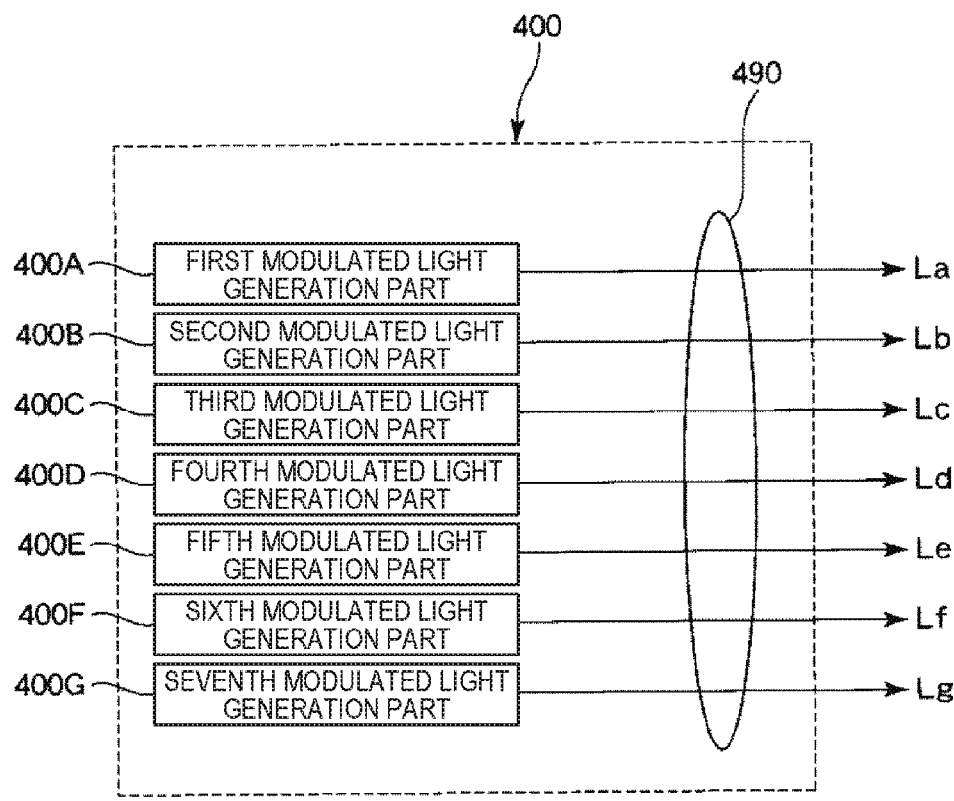
FIG. 20 shows a configuration of a light output part of an image display apparatus according to a sixth embodiment of the invention.
Figure 21:
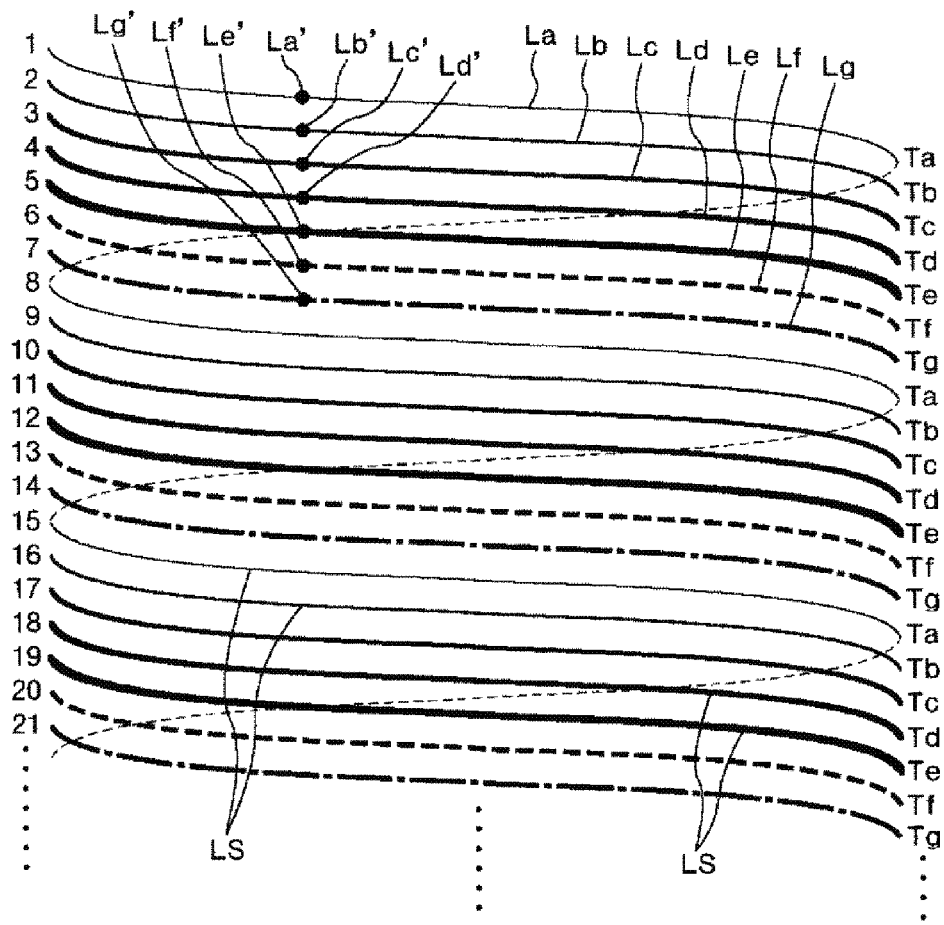
FIG. 21 shows scanning tracks of modulated lights on an image plane.

FIG. 20 shows a configuration of a light output part of an image display apparatus according to a sixth embodiment of the invention. FIG. 21 shows scanning tracks of modulated lights on an image plane.

As below, the image display apparatus according to the sixth embodiment of the invention will be explained, and the explanation will be made with a focus on differences from the above described embodiments and the explanation of the same items will be omitted.

The image display apparatus of the sixth embodiment is the same as the above described first embodiment except that the configuration of the light output part is different. The same configurations as those of the above described embodiments have the same signs.

As shown in FIG. 20, a light output part 400 of the embodiment has a first modulated light generation part 400A, a second modulated light generation part 400B, a third modulated light generation part 4000, a fourth modulated light generation part 400D, a fifth modulated light generation part 400E, a sixth modulated light generation part 400F, and a seventh modulated light generation part 400G. The seventh modulated light generation part 400G has the same configuration as the first modulated light generation part 400A. Hereinafter, modulated light L generated in the seventh modulated light generation part 400G is referred to as "modulated light Lg".

Next, a scanning method of the modulated lights La, Lb, Lc, Ld, Le, Lf, Lg will be explained in detail.

FIG. 21 shows scanning tracks Ta, Tb, Tc, Td, Te, Tf, Tg of modulated lights La, Lb, Lc, Ld, Le, Lf, Lg on the image plane. As shown in the drawing, the scanning tracks Ta are located on (1+7q)th (q is an integer equal to or more than zero) scanning lines LS1, LS8, LS15, LS22 . . . , the scanning tracks Tb are located on (2+7q) th scanning lines LS2, LS9, LS16, L23 . . . , the scanning tracks Tc are located on (3+7q) th scanning lines LS3, LS10, LS17 . . . , the scanning tracks Td are located on (4+7q)th scanning lines LS4, LS11, LS18 . . . , the scanning tracks Te are located on (5+7q)th scanning lines LS5, LS12, LS19 . . . , the scanning tracks Tf are located on (6+7q)th scanning lines LS6, LS13, LS20 . . . , and the scanning tracks Tg are located on (7+7q)th scanning lines LS7, LS14, LS21 . . . . That is, scanning with the modulated lights La to Lg is performed for seven scanning lines LS at a time, and the scanning tracks Ta to Tg are alternately located sequentially from the scanning line LS1 without overlapping with one another. Further, irradiated points La' to Lg' of the modulated lights La to Lg at a certain time are arranged side by side in the second directions, and scanning with the modulated lights La to Lg is performed in the first directions and the second directions with the position relationship maintained. Note that the irradiated points La' to Lg' may be arranged in directions crossing the first directions.

On this account, regardless of times (in other words, the attitude of the movable portion 610), the irradiated point La' is located in a position different from those of the scanning tracks Tb, Tc, Td, Te, Tf, Tg, the irradiated point Lb' is located in a position different from those of the scanning tracks Ta, Tc, Td, Te, Tf, Tg, the irradiated point Lc' is located in a position different from those of the scanning tracks Ta, Tb, Td, Te, Tf, Tg, the irradiated point Ld' is located in a position different from those of the scanning tracks Ta, Tb, Tc, Te, Tf, Tg, the irradiated point Le' is located in a position different from those of the scanning tracks Ta, Tb, Tc, Td, Tf, Tg, the irradiated point Lf' is located in a position different from those of the scanning tracks Ta, Tb, Tc, Td, Te, Tg, and the irradiated point Lg' is located in a position different from those of the scanning tracks Ta, Tb, Tc, Td, Te, Tf. Further, assuming that scanning with the seven modulated lights La to Lg is performed on the $m_1$th to $m_7$th ($m_1$ to $m_7$ are natural numbers) scanning lines LS from the top of the image plane, remainders of division of the respective $m_1$ to $m_7$ by the number of modulated lights "7" are different from one another among the modulated lights La to Lg. In the case of the embodiment, the remainder is "1" for the modulated light La, the remainder is "2" for the modulated light Lb, the remainder is "3" for the modulated light Lc, the remainder is "4" for the modulated light Ld, the remainder is "5" for the modulated light Le, the remainder is "6" for the modulated light Lf, and the remainder is "0" for the modulated light Lg.

According to the sixth embodiment, the same advantages as those of the above described first embodiment may be obtained.

Note that, in the embodiment, the irradiated points La', Lb', Lc', Ld', Le', Lf', Lg' at the respective times are located on the scanning lines LS lying next to each other. Accordingly, none of the scanning lines LS is located between the irradiated points La' and Lb', between the irradiated points Lb' and Lc', between the irradiated points Lc' and Ld', between the irradiated points Ld' and Le', between the irradiated points Le' and Lf', and between the irradiated points Lf' and Lg'. However, the numbers of scanning lines LS located between the irradiated points are not particularly limited unless the scanning tracks Ta, Tb, Tc, Td, Te, Tf, Tg overlap with one another. For example, in the case where the irradiated points La', Lb', Lc', Ld', Le', Lf', Lg' are arranged at equal intervals in the second directions and the same numbers of scanning lines LS are respectively located between the irradiated points, the numbers of scanning lines LS located between the irradiated points may satisfy a relationship of 7N (N is an integer equal to or more than zero).

Seventh Embodiment

Figure 22:
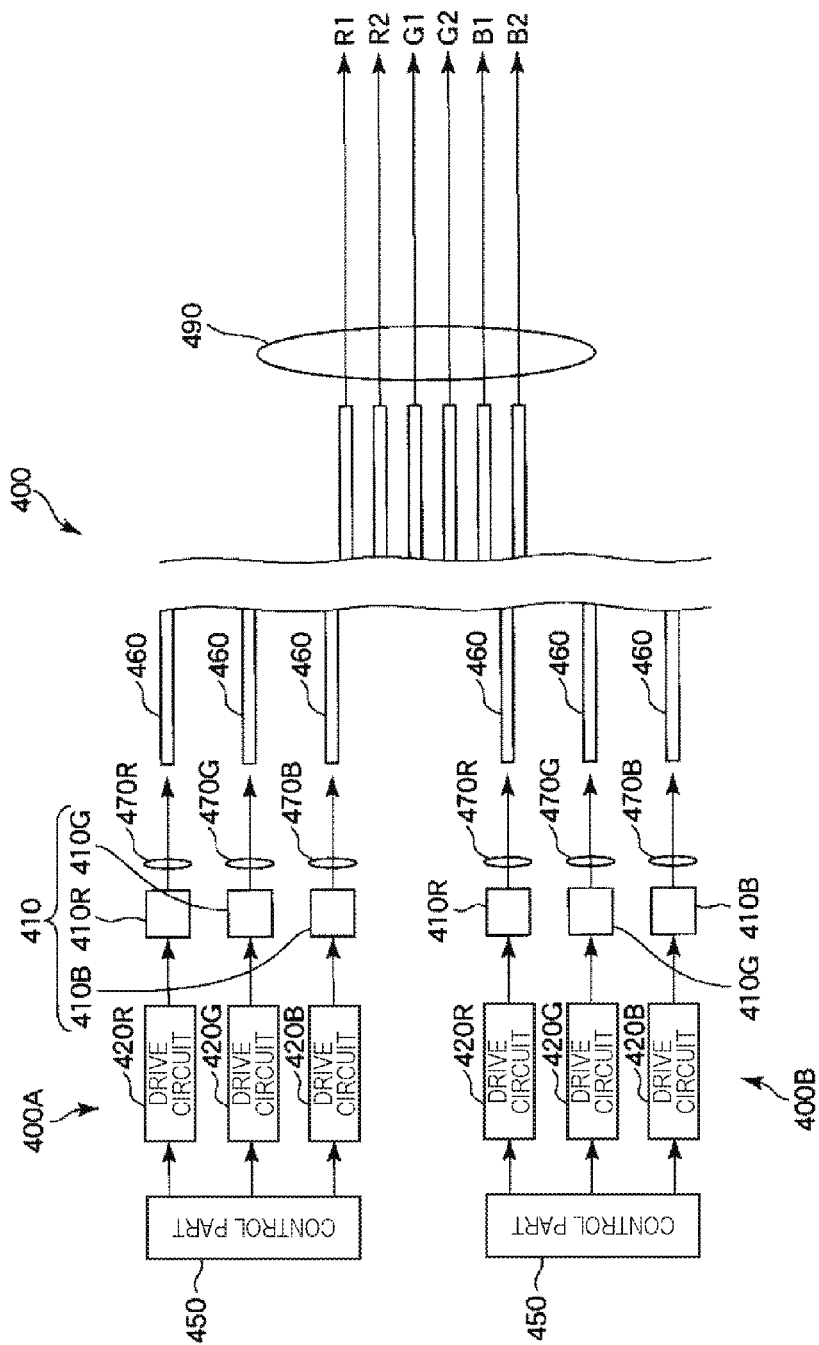
FIG. 22 shows a configuration of a light output part of an image display apparatus according to a seventh embodiment of the invention.
Figure 23:
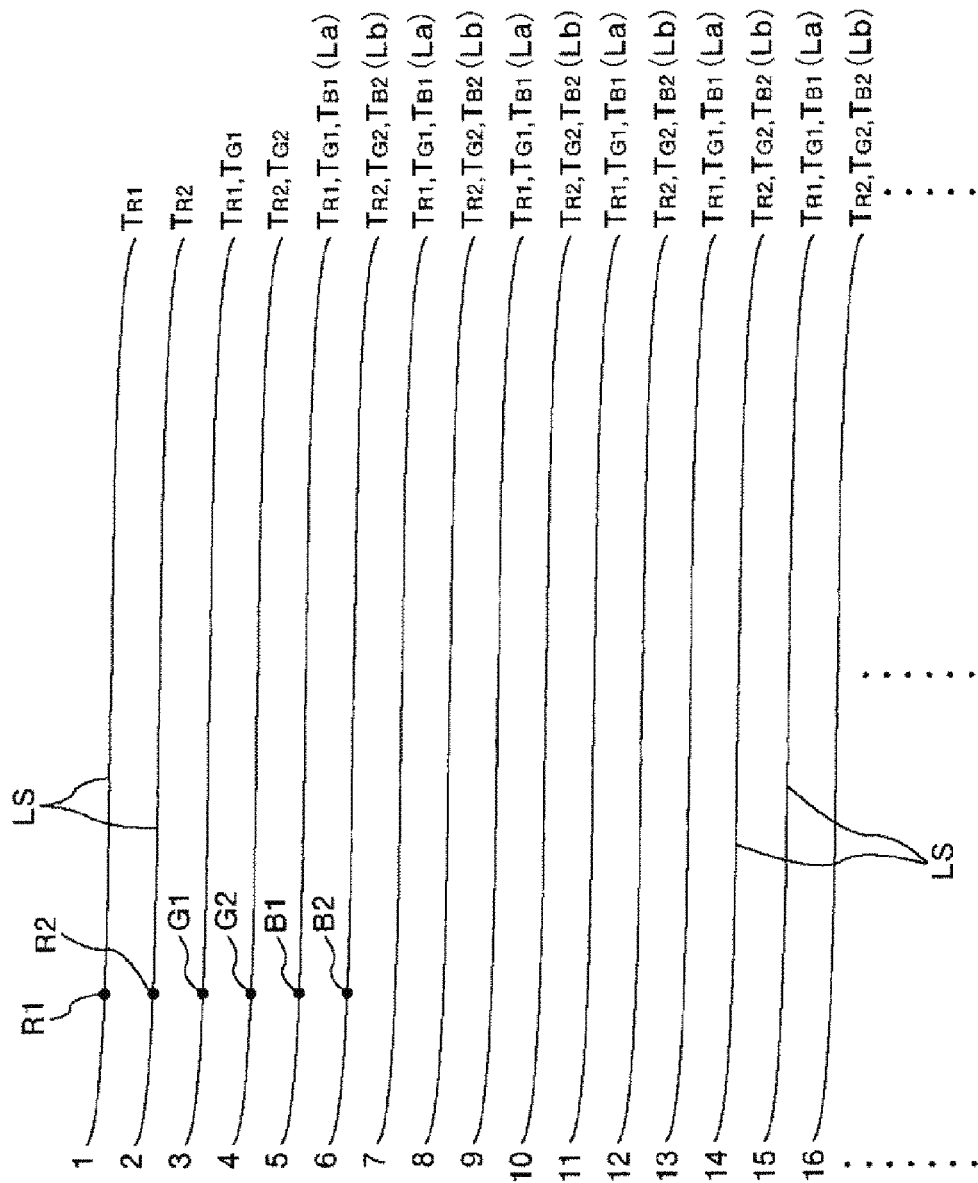
FIG. 23 shows scanning tracks of modulated lights on an image plane.

FIG. 22 shows a configuration of a light output part of an image display apparatus according to a seventh embodiment of the invention. FIG. 23 shows scanning tracks of modulated lights on an image plane.

As below, the image display apparatus according to the seventh embodiment of the invention will be explained, and the explanation will be made with a focus on differences from the above described embodiments and the explanation of the same items will be omitted.

The image display apparatus of the seventh embodiment is the same as the above described first embodiment except that the configuration of the light output part is different. The same configurations as those of the above described embodiments have the same signs.

As shown in FIG. 22, a first modulated light generation part 400A of the embodiment has a light source part 410 having light sources 410R, 410G, 410B, drive circuits 420R, 420G, 420B that drive the light sources 410R, 410G, 410B, collimator lenses 470R, 470G, 470B, light guiding parts 460, and a control part 450. In the first modulated light generation part 400A, lights from the light sources 410R, 410G, 410B are not combined, but respectively guided to a collecting lens 490 using the light guiding parts 460. Then, scanning with red light (first color light), green light (second color light), and blue light (third color light) is respectively performed by a light scanning part 600. A second modulated light generation part 400B has the same configuration. Therefore, the light scanning part 600 performs scanning with the same numbers of luminous fluxes of red light, luminous fluxes of green light, and luminous fluxes of blue light. Hereinafter, the red light (luminous flux), the green light (luminous flux), and the blue light (luminous flux) from the first modulated light generation part 400A are referred to as "red light R1", "green light G1", and "blue light B1", and the red light (luminous flux), the green light (luminous flux), and the blue light (luminous flux) from the second modulated light generation part 400B are referred to as "red light R2", "green light G2", and "blue light B2".

Next, a scanning method of the red lights R1, R2, the green lights G1, G2, and the blue lights B1, B2 will be explained in detail.

FIG. 23 shows scanning tracks $T_{R1}$, $T_{R2}$, $T_{G1}$, $T_{G2}$, $T_{B1}$, $T_{B2}$ of the red lights R1, R2, the green lights G1, G2, and the blue lights B1, B2 on the image plane. On the image plane, respective irradiated points of the respective color lights are located in different positions. As shown in the drawing, the scanning tracks $T_{R1}$ are located on (1+2q)th (q is an integer equal to or more than zero) scanning lines LS1, LS3, LS5, LS7, LS9 . . . , the scanning tracks $T_{G1}$ are located on (3+2q)th scanning lines LS3, LS5, LS7, LS9 . . . , and the scanning tracks $T_{B1}$ are located on (5+2q)th scanning lines LS5, LS7, LS9 . . . . Thereby, the red lights R1, the green lights G1, and the blue lights B1 are superimposed (combined) on the scanning lines LS5, LS7, LS9 . . . , and modulated light La corresponding to the driving of the first modulated light generation part 400A is generated. Similarly, the scanning tracks $T_{R2}$ are located on (2+2q)th (q is an integer equal to or more than zero) scanning lines LS2, LS4, LS6, LS8, LS10 . . . , the scanning tracks $T_{G2}$ are located on (4+2q)th scanning lines LS4, LS6, LS8, LS10 . . . , and the scanning tracks $T_{B2}$ are located on (6+2q)th scanning lines LS6, LS8, LS10 . . . . Thereby, the red lights R2, the green lights G2, and the blue lights B2 are superimposed (combined) on the scanning lines LS6, LS8, LS10 . . . , and modulated light Lb corresponding to the driving of the second modulated light generation part 400B is generated. Accordingly, scanning with the modulated light La is performed on the odd-numbered scanning lines LS and scanning with the modulated light Lb is performed on the even-numbered scanning lines LS.

According to the seventh embodiment, the same advantages as those of the above described first embodiment may be obtained. Note that, in the embodiment, the configuration that displays images using three color lights of red light, green light, and blue light is shown, however, not limited to that. For example, yellow light may be further added and the four color lights may be used, or a color light having another wavelength may be added.

Eighth Embodiment

Figure 24:
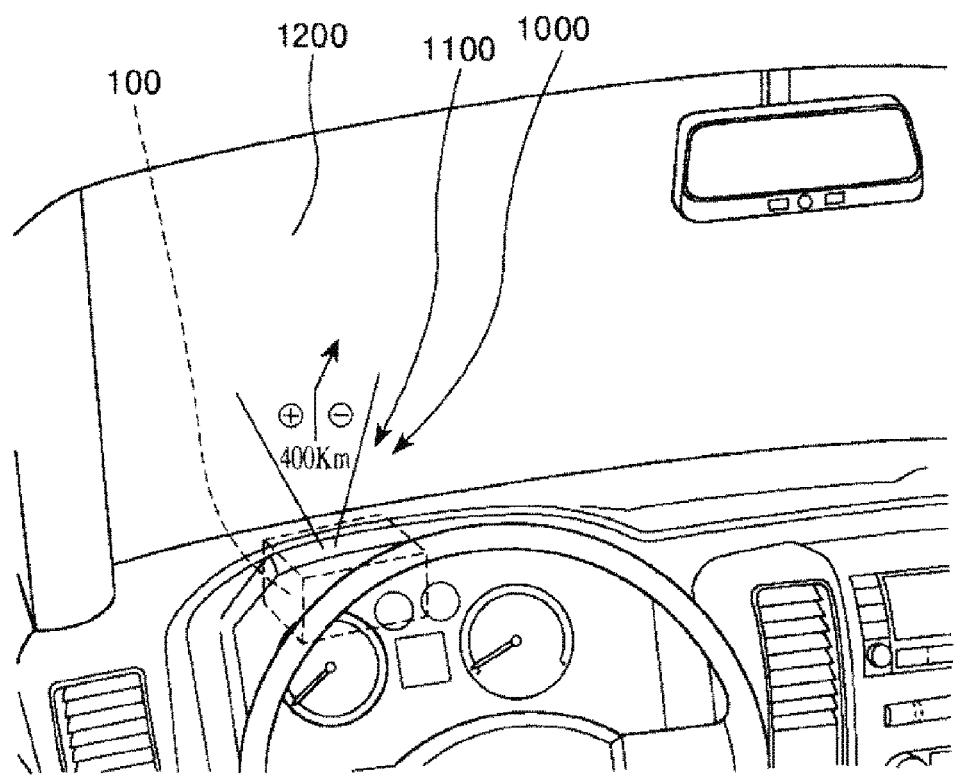
FIG. 24 shows an image display apparatus according to an eighth embodiment of the invention.
Figure 25:
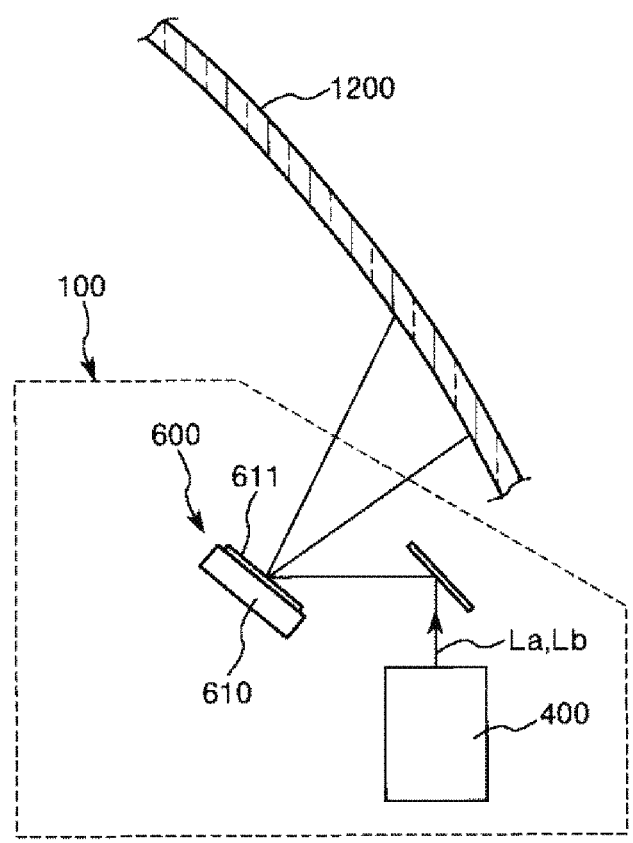
FIG. 25 shows an optical system of the image display apparatus shown in FIG. 24.

FIG. 24 shows an image display apparatus according to an eighth embodiment of the invention. FIG. 25 shows an optical system of the image display apparatus shown in FIG. 24.

As below, the image display apparatus according to the eighth embodiment of the invention will be explained, and the explanation will be made with a focus on differences from the above described embodiments and the explanation of the same items will be omitted.

The image display apparatus of the eighth embodiment is the same as the above described first embodiment except that the apparatus is applied to a head-up display. The same configurations as those of the above described embodiments have the same signs.

In a head-up display system 1000 shown in FIGS. 24 and 25, the image display apparatus 100 is mounted on a dashboard of an automobile to form a head-up display 1100. By the head-up display 1100, e.g. a predetermined image including a guide display to a destination or the like may be displayed on a windshield 1200. The head-up display system 1000 may be applied not only to the automobile but also to e.g. an airplane, a ship, or the like.

Ninth Embodiment

Figure 26:
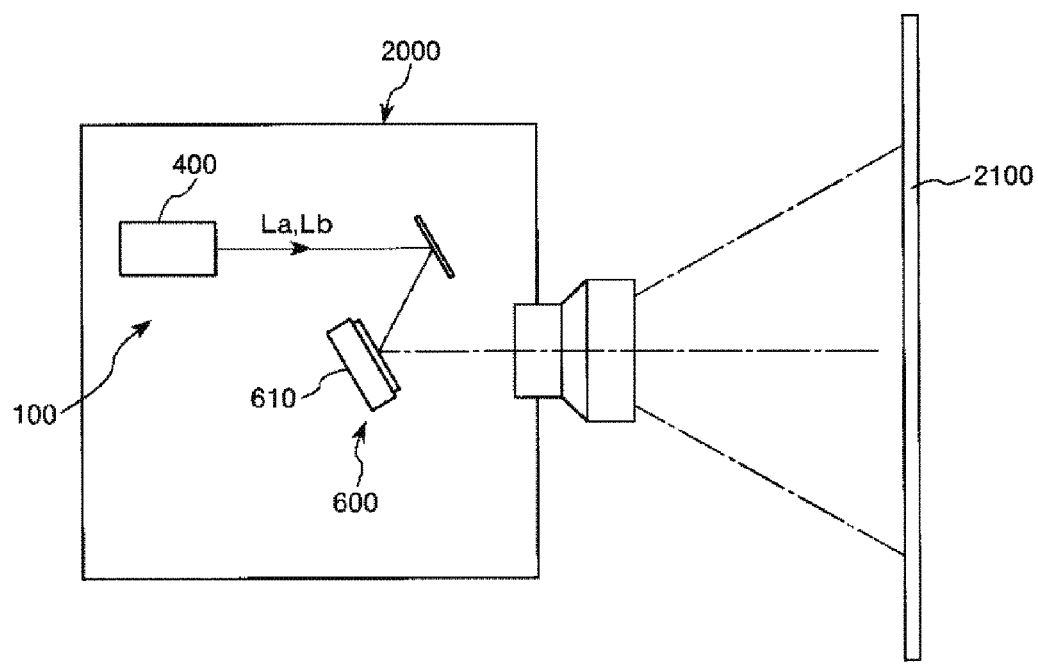
FIG. 26 shows an image display apparatus according to a ninth embodiment of the invention.

FIG. 26 shows an image display apparatus according to a ninth embodiment of the invention.

As below, the image display apparatus according to the ninth embodiment of the invention will be explained, and the explanation will be made with a focus on differences from the above described embodiments and the explanation of the same items will be omitted.

The image display apparatus of the ninth embodiment is the same as the above described first embodiment except that the apparatus is applied to a projector. The same configurations as those of the above described embodiments have the same signs.

A projector 2000 shown in FIG. 26 includes the image display apparatus 100. According to the projector 2000, a predetermined image may be displayed on an object 2100 including e.g. a screen, a wall surface, or the like.

As above, the image display apparatus according to the invention is explained based on the illustrated embodiments, however, the invention is not limited to those. For example, in the image display apparatus according to the invention, the configurations of the respective parts may be replaced by arbitrary configurations having the same functions or another arbitrary configuration may be added.

Further, the image display apparatus according to the invention is not limited to the case applied to a spectacle-shaped head mounted display as long as the apparatus forms a virtual image as an image visually recognized by the observer. For example, the apparatus can be applied to a helmet-shaped or headset-shaped head mounted display, an image display apparatus in a form supported by the body (neck, shoulder, or the like) of the observer, or the like. In the above described embodiments, the case where the entire image display apparatus is worn on the head of the observer is explained as an example, however, the image display apparatus may have a part attached to the head of the observer and a part attached to another part than the head of the observer or carried.

Further, in the above described embodiments, the configuration in which the number of modulated lights is from two to seven is explained, however, the number of modulated lights is not limited to that, but eight or more. Note that it is preferable that the number of modulated lights is seven or less. Thereby, excessive increase of the modulated lights is prevented, and the complexity of control and deterioration of images due to overlapping of scanning tracks of the respective modulated lights may be reduced.

Furthermore, in the above described embodiments, the configuration of the transmissive head mounted display is representatively explained, however, a configuration of non-transmissive head mounted display by which an outside scenery is blocked when the observer wears the head mounted display may be employed. Or, the image display apparatus according to the invention may have a device that outputs sound including a speaker, a headphone, or the like.

The entire disclosure of Japanese Patent Application No. 2015-106190, filed May 26, 2015 is expressly incorporated by reference herein.

What is claimed is:

1. An image display apparatus comprising:
a light output part that outputs n (n is an integer equal to or more than two) luminous fluxes; and
a light scanning part having a swingable movable portion and performing scanning with the respective luminous fluxes reflected by the movable portion in first directions and second directions crossing the first directions,
wherein the light scanning part performs scanning with the respective luminous fluxes at a first frequency in the first directions and a second frequency higher than the first frequency in the second directions and only in ones of outward paths and return paths with respect to the first directions,
in an image plane as a plane on which the luminous fluxes of the scanning by the light scanning part form an image,
irradiated points of the respective luminous fluxes are arranged side by side in directions crossing the first directions,
the scanning of the respective luminous fluxes is performed in the second directions for n scanning lines extending in the first directions at a time, and
the irradiated points of the respective luminous fluxes when the movable portion takes a certain attitude are located in positions different from those of scanning tracks of the other luminous fluxes.

2. The image display apparatus according to claim 1, wherein, assuming that scanning with the respective n luminous fluxes is performed on the respective $m_1$th to $m_n$th ($m_1$ to $m_n$ are natural numbers) scanning lines from one side of the image plane in the second directions, remainders of division of the respective $m_1$ to $m_n$ by n are different from one another.

3. The image display apparatus according to claim 1, wherein the n is three or more, and
when the movable portion takes a certain attitude, in at least two of the n luminous fluxes, the scanning lines corresponding to the irradiated points of each other lie next to each other.

4. The image display apparatus according to claim 1, wherein the n is three or more, and
when the movable portion takes a certain attitude, in at least two of the n luminous fluxes, the scanning lines corresponding to the other luminous fluxes are located between the scanning lines corresponding to the irradiated points of each other.

5. The image display apparatus according to claim 1, wherein the n is three or more, and
when the movable portion takes a certain attitude, the scanning lines corresponding to the irradiated points of the respective luminous fluxes are apart from each other at equal intervals.

6. The image display apparatus according to claim 1, wherein the n is seven or less.

7. The image display apparatus according to claim 1, wherein the luminous flux is a modulated light having modulated intensity.

8. The image display apparatus according to claim 1, wherein the light output part outputs n luminous fluxes of a first color light and n luminous fluxes of a second color light,
irradiated points of the n luminous fluxes of the first color light and irradiated points of the n luminous fluxes of the second color light when the movable portion takes a certain attitude are located in different positions on the image plane, and
the irradiated points of the n luminous fluxes of the first color light and the irradiated points of the n luminous fluxes of the second color light are combined on the image plane by scanning in the second directions.

9. The image display apparatus according to claim 1, being a head mounted display worn on the head of an observer.

* * * * *